US012508827B2

(12) United States Patent
Murayama et al.

(10) Patent No.: US 12,508,827 B2
(45) Date of Patent: Dec. 30, 2025

(54) ACTIVE ENERGY IRRADIATION DEVICE AND INKJET PRINTER

(71) Applicant: HAMAMATSU PHOTONICS K.K., Hamamatsu (JP)

(72) Inventors: Kyoichi Murayama, Hamamatsu (JP); Keita Umeno, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 48 days.

(21) Appl. No.: 18/293,493

(22) PCT Filed: Apr. 6, 2022

(86) PCT No.: PCT/JP2022/017191
§ 371 (c)(1),
(2) Date: Jan. 30, 2024

(87) PCT Pub. No.: WO2023/026577
PCT Pub. Date: Mar. 2, 2023

(65) Prior Publication Data

US 2025/0121618 A1 Apr. 17, 2025

(30) Foreign Application Priority Data

Aug. 24, 2021 (JP) ................................ 2021-136099

(51) Int. Cl.
*B41J 29/377* (2006.01)
*B41J 11/00* (2006.01)

(52) U.S. Cl.
CPC ....... *B41J 29/377* (2013.01); *B41J 11/00214* (2021.01); *B41J 11/00218* (2021.01)

(58) Field of Classification Search
CPC ................ B41J 29/377; B41J 11/00214; B41J 11/00218; B41J 2/01; F26B 3/283;
(Continued)

(56) References Cited

FOREIGN PATENT DOCUMENTS

| | | | |
|---|---|---|---|
| CN | 101927620 | A | 12/2010 |
| CN | 204382834 | U | 6/2015 |

(Continued)

OTHER PUBLICATIONS

Extended European Search Report issued on May 23, 2025 in corresponding European patent application 22860875.8.

(Continued)

*Primary Examiner* — Bradley W Thies
(74) *Attorney, Agent, or Firm* — Faegre Drinker Biddle & Reath LLP

(57) ABSTRACT

An active energy irradiation device includes a housing, an irradiation unit, a heat conduction member, a first opening that is provided at the housing, and an air introduction unit that deflects air flowing into the housing along a first direction via the first opening to a second direction intersecting the first direction to introduce the air to the heat conduction member. The air introduction unit includes a partition that is provided to face the first opening in the housing, and a filter that is provided between the first opening and the partition, and collects foreign substances contained in the air. The filter includes a first filter portion that is provided on the heat conduction member side to come into contact with the partition without being exposed from the first opening as viewed from the first direction.

15 Claims, 18 Drawing Sheets

(58) Field of Classification Search
CPC ........ F26B 3/28; F26B 13/00; B41F 23/0409; B41F 23/0453
See application file for complete search history.

(56) References Cited

FOREIGN PATENT DOCUMENTS

| | | | | |
|---|---|---|---|---|
| CN | 106183453 | A | 12/2016 | |
| CN | 209616672 | U | 11/2019 | |
| CN | 112384369 | A | 2/2021 | |
| JP | 2004-130665 | A | 4/2004 | |
| JP | 2005-103845 | A | 4/2005 | |
| JP | 2014-188927 | A | 10/2014 | |
| JP | 2017-200740 | A | 11/2017 | |
| JP | 2017-226095 | A | 12/2017 | |
| JP | 2018-134815 | A | 8/2018 | |
| JP | 2019-040074 | A | 3/2019 | |
| JP | 2019-071231 | A | 5/2019 | |
| JP | 2019-180927 | A | 10/2019 | |
| JP | 2022-157844 | A | 10/2022 | |
| WO | WO-2018/105010 | A1 | 6/2018 | |
| WO | WO-2020158738 | A1 * | 8/2020 | ......... H10H 20/8582 |

OTHER PUBLICATIONS

International Preliminary Report on Patentability mailed Mar. 7, 2024 for PCT/JP2022/017191.

* cited by examiner

ACTIVE ENERGY IRRADIATION DEVICE AND INKJET PRINTER

TECHNICAL FIELD

The present disclosure relates to an active energy irradiation device and an inkjet printer.

BACKGROUND ART

As a technique related to an active energy irradiation device, for example, Patent Literature 1 describes a light irradiation device including a housing and a light source (irradiation unit) disposed in the housing. In the light irradiation device described in Patent Literature 1, an intake port through which air is sucked from an outside is provided in the housing, and the light source is cooled by the air flowing into the housing via a suction port.

CITATION LIST

Patent Literature

Patent Literature 1: Japanese Unexamined Patent Publication No. 2005-103845

SUMMARY OF INVENTION

Technical Problem

Foreign substances such as ink mist are floating in a device such as an injector printer in which the above-described active energy irradiation device is disposed. Thus, in the above-described active energy irradiation device, in order to suppress the entry of the foreign substances into the housing, a filter that collects foreign substances contained in the air flowing into the housing may be attached. However, in this case, clogging of the filter progresses as a use time of the device increases, a flow rate of the air flowing into the housing decreases. Thus, there is a possibility that a temperature of the irradiation unit rises (cooling is insufficient).

An object of the present disclosure is to provide an active energy irradiation device and an inkjet printer capable of suppressing an increase in a temperature of an irradiation unit accompanying an increase in a use time.

Solution to Problem

An active energy irradiation device according to one aspect of the present disclosure includes a housing, an irradiation unit that is disposed in the housing, and is configured to irradiate active energy rays, a heat conduction member that is disposed in the housing, and is thermally connected to the irradiation unit, a first opening that is provided at the housing, and an air introduction unit that deflects air flowing into the housing along a first direction via the first opening to a second direction intersecting the first direction to introduce the air to the heat conduction member. The air introduction unit includes a partition that is provided to face the first opening in the housing, and a filter that is provided between the first opening and the partition, and collects foreign substances contained in the air, and the filter includes a first filter portion that is provided on the heat conduction member side to come into contact with the partition without being exposed from the first opening as viewed from the first direction.

In the active energy irradiation device, the air is introduced into the heat conduction member by the air introduction unit, the heat conduction member is cooled by the air, and the irradiation unit is cooled. In the air introduction unit, the foreign substances contained in the air are collected and removed by the filter including the first filter portion. Here, in the air introduction unit, the air flowing into the housing along the first direction via the first opening is deflected in the second direction intersecting the first direction and is introduced into the heat conduction member. As a result, a portion through which air easily passes on the deflected second direction side can be formed in a region (hereinafter, also referred to as a "filter exposure region") exposed from the first opening of the filter. In addition, since formation of a space between the filter and the partition can be suppressed by the presence of the first filter portion, a difference in a resistance loss of the air can be easily formed, and a portion through which air easily passes can be reliably formed in the filter exposure region. Accordingly, at the beginning of use of the device, the air flowing into the housing via the first opening does not uniformly pass through the entire filter exposure region, but mainly passes through a part thereof. When the clogging of the part of the filter progresses, a region through which air mainly passes transitions to another part of the filter exposure region, and this transition is repeated with the increase in the use time of the device. Consequently, even when the use time of the device increases, it is easy to secure a region where clogging has not progressed yet in the filter in the filter exposure region, and it is easy to secure a distribution amount of the air introduction unit similar to a distribution amount at the beginning of use. As a result, it is possible to suppress the increase in the temperature of the irradiation unit due to the increase in the use time.

In the active energy irradiation device according to one aspect of the present disclosure, an entire region of the filter on the partition side comes into contact with the partition. In this case, the filter can be effectively supported by the partition.

In the active energy irradiation device according to one aspect of the present disclosure, the filter may include a second filter portion that is provided on at least a side opposite to the heat conduction member side, and has a thickness in the first direction thinner than the first filter portion. In a case where the air is introduced into the heat conduction member through the side opposite to the heat conduction member in the filter, a passage path thereof becomes long, and a resistance loss is likely to increase. In this regard, according to one aspect of the present disclosure, in a case where the air passes through the side opposite to the heat conduction member side of the filter, since the filter includes the second filter portion, the passage path of the filter can be shortened, and the resistance loss of the air can be reduced.

In the active energy irradiation device according to one aspect of the present disclosure, the second filter portion may be configured such that the thickness in the first direction becomes thinner toward the side opposite to the heat conduction member side. With such a configuration, it is possible to specifically realize the reduction of the resistance loss of the air in a case where the air passes through the opposite side of the heat conduction member side of the filter.

In the active energy irradiation device according to one aspect of the present disclosure, the second filter portion may have a constant thickness thinner than the first filter portion. With such a configuration, it is possible to specifically realize the reduction of the resistance loss of the air in a case where the air passes through the opposite side of the heat conduction member side of the filter.

The active energy irradiation device according to one aspect of the present disclosure may include a skirt portion that is disposed on the irradiation unit side from the first opening on an outer surface of the housing, and is provided to protrude in the first direction. In this case, the air containing the foreign substances such as ink mist present around the device can be efficiently guided to the first opening by the skirt portion.

In the active energy irradiation device according to one aspect of the present disclosure, the filter may include a plurality of layers. In this case, for example, a density of each of the plurality of layers in the filter is changed, and thus, collection performance of the foreign substances, the resistance loss of the air, and the like in the filter can be adjusted.

The active energy irradiation device according to one aspect of the present disclosure may include a second opening that is provided in the housing, and causes the air having passed through the heat conduction member to flow out of the housing. In this case, the air having cooled the heat conduction member can flow out of the housing via the second opening.

In the active energy irradiation device according to one aspect of the present disclosure, the heat conduction member may be a heat sink. In this case, the irradiation unit can be cooled by using the heat sink as the heat conduction member.

In the active energy irradiation device according to one aspect of the present disclosure, the irradiation unit may include a plurality of ultraviolet LEDs. In this case, ultraviolet rays can be irradiated as active energy.

In the active energy irradiation device according to one aspect of the present disclosure, the filter may come into contact with the heat conduction member. In this case, the filter can be effectively supported by the heat conduction member.

In the active energy irradiation device according to one aspect of the present disclosure, the first filter portion may be provided to cover a flow path of the air in the air introduction unit. In this case, the foreign substances contained in the air can be more reliably collected by the first filter portion.

In the active energy irradiation device according to one aspect of the present disclosure, a mark indicating that a clogging ratio of the filter is a predetermined ratio may be provided to at least any one of the filter and the housing. In this case, it is possible to easily confirm whether or not clogging has transitioned to a predetermined ratio in the filter by referring to the mark.

In the active energy irradiation device according to one aspect of the present disclosure, the active energy irradiation device may irradiate a printed matter to which ink adheres, as an object to be irradiated, and the filter is a filter of a color different from a color of the ink. In this case, a state of transition of clogging in the filter becomes clear, and it is possible to easily confirm a degree of clogging.

An inkjet printer according to another aspect of the present disclosure includes the active energy irradiation device. In this inkjet printer, the above effect, that is, the effect of suppressing the increase in the temperature of the irradiation unit with the increase in the use time can also be obtained by the active energy irradiation device.

Advantageous Effects of Invention

According to the present disclosure, it is possible to provide the active energy irradiation device and the inkjet printer capable of suppressing the increase in the temperature of the irradiation unit accompanying the increase in the use time.

BRIEF DESCRIPTION OF DRAWINGS

FIG. 7(*e*) is a graph showing a relationship between clogging of the filter and the temperature of the irradiation unit in the active energy irradiation device according to the embodiment.

FIG. 8(*e*) is a graph showing a relationship between clogging of the filter and a temperature of an irradiation unit in the active energy irradiation device according to the comparative example.

DESCRIPTION OF EMBODIMENTS

Figure 1:
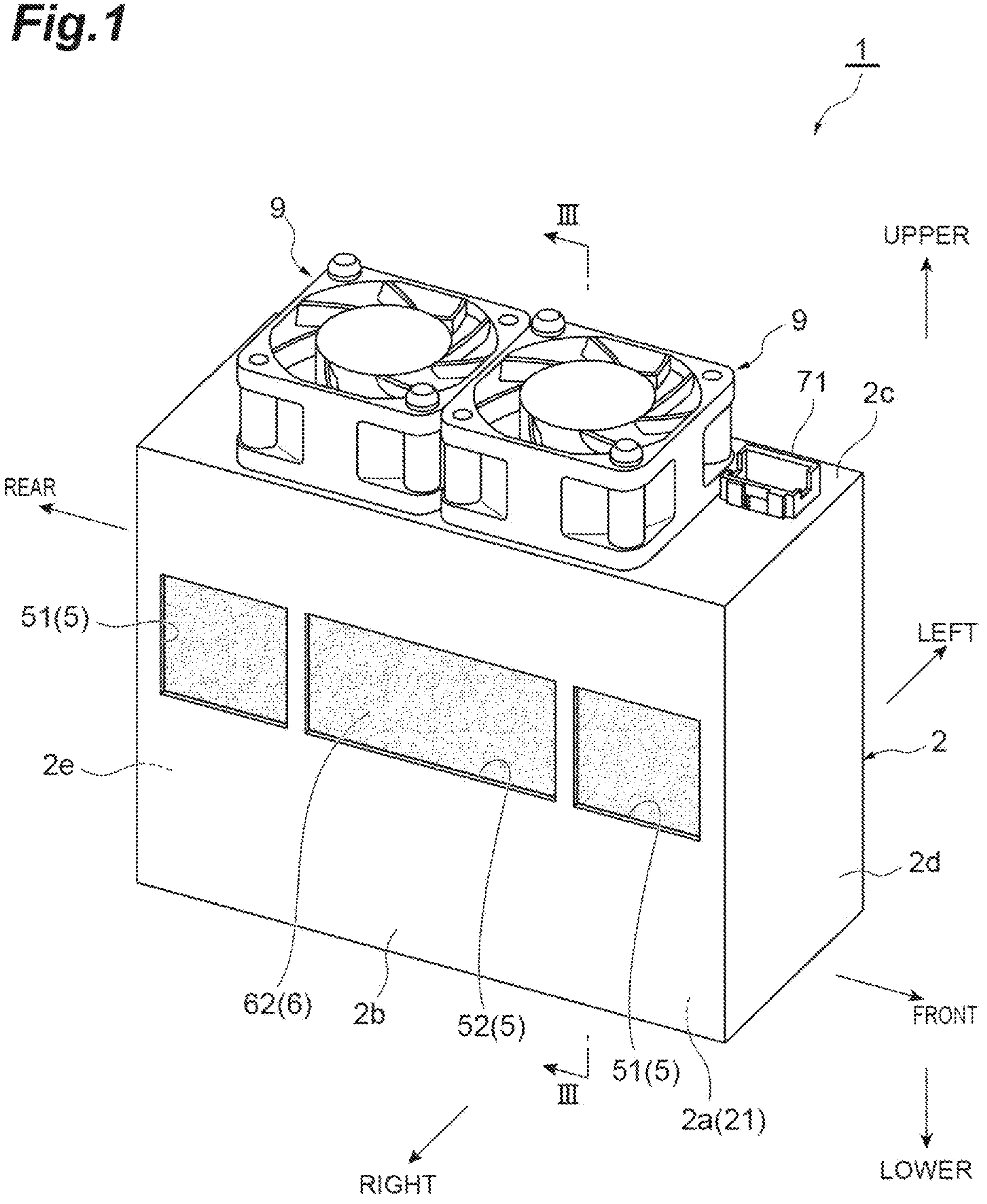
FIG. 1 is a perspective view illustrating an active energy irradiation device according to an embodiment.

Hereinafter, an embodiment will be described in detail with reference to the drawings. The same or corresponding portions in the drawings are denoted with the same reference signs, and repetitive descriptions will be omitted.

Figure 2:
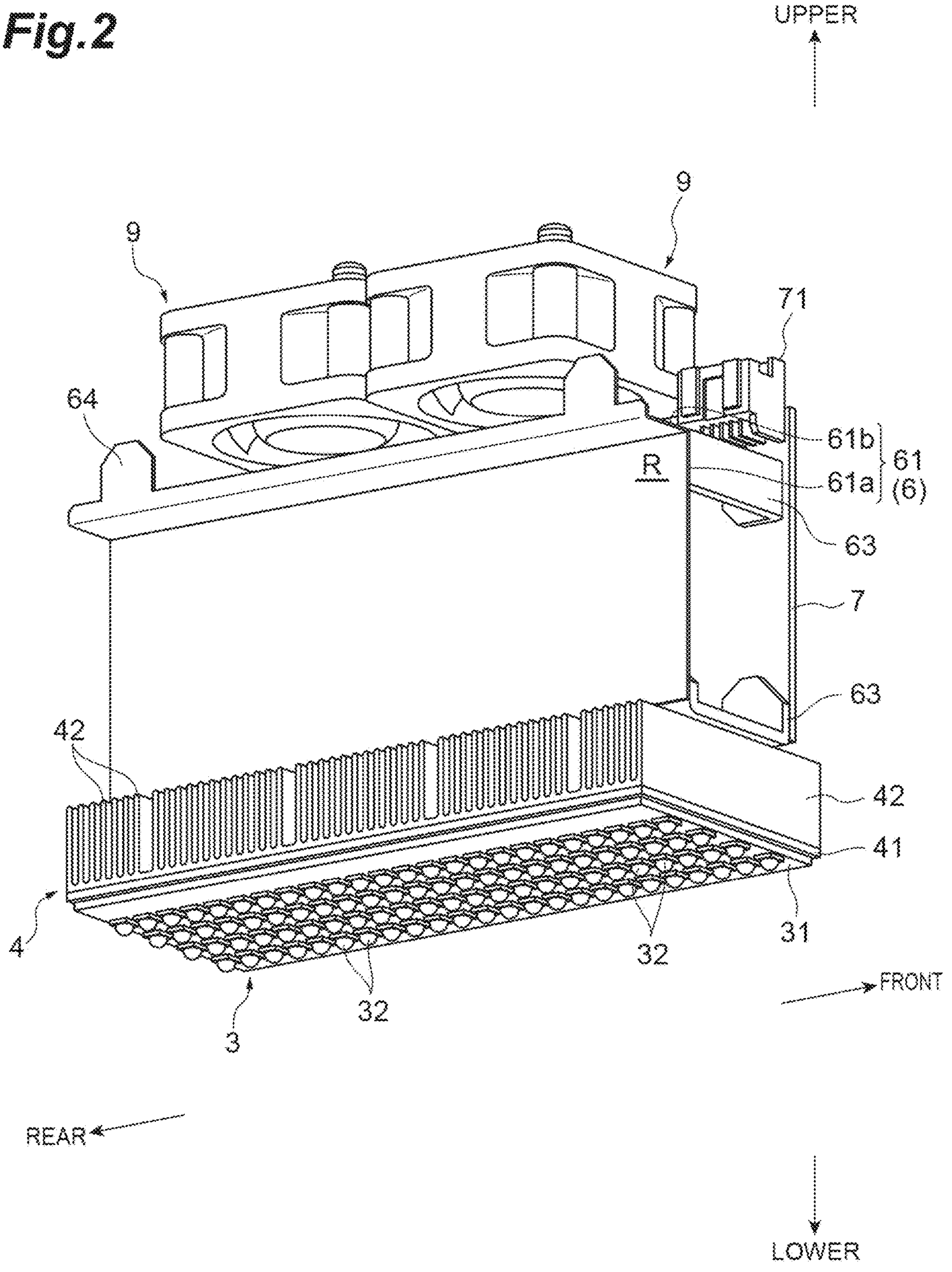
FIG. 2 is a perspective view illustrating an inside of a housing of the active energy irradiation device according to the embodiment.
Figure 3:
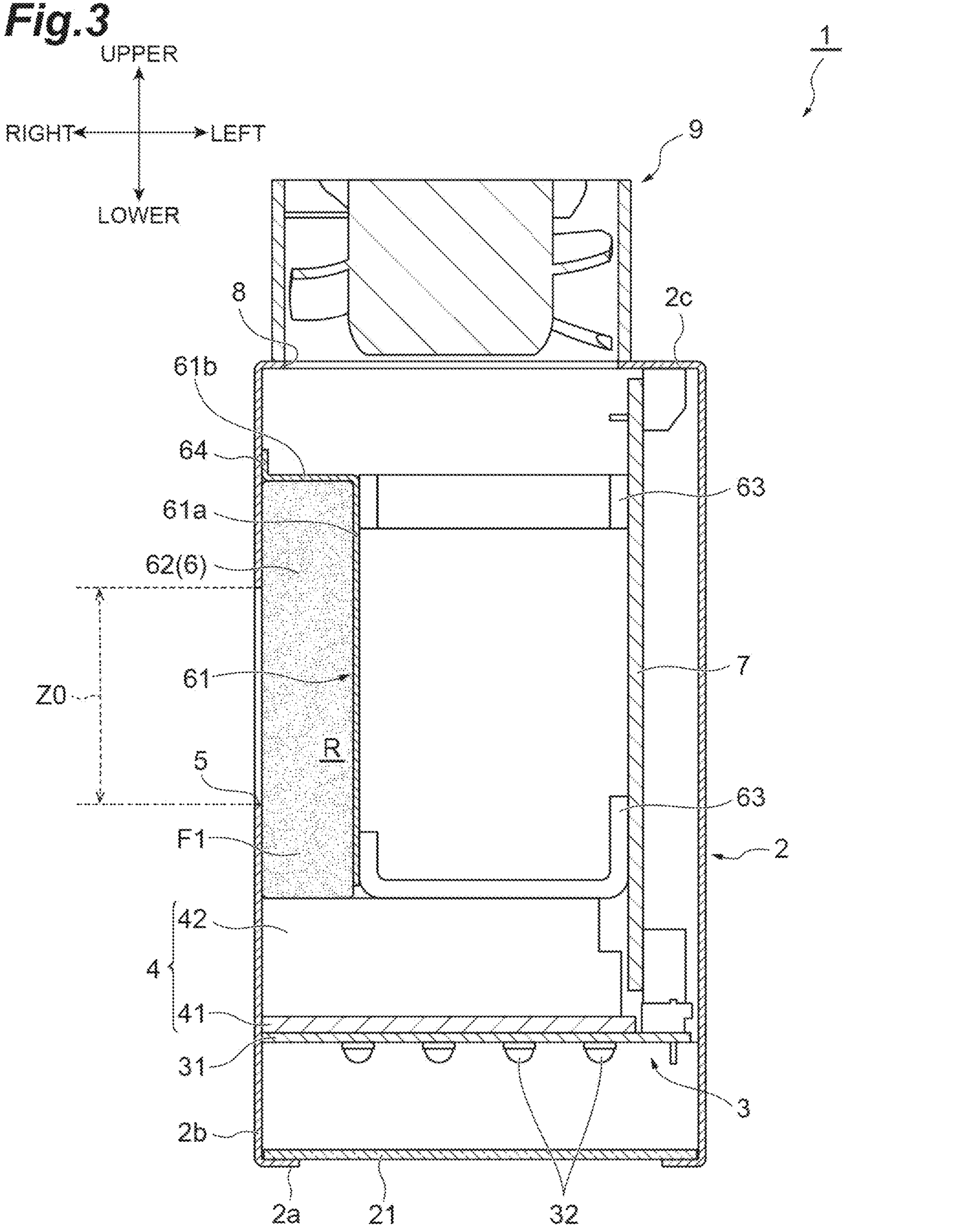
FIG. 3 is a cross-sectional view taken along line III-III of FIG. 1.

An active energy irradiation device 1 illustrated in FIG. 1 is, for example, an LED light source (light irradiation device) for printing. The active energy irradiation device 1 irradiates an object to be irradiated with ultraviolet rays (active energy rays) to perform ink drying and the like of the object to be irradiated. Examples of the object to be irradiated include a printed matter to which a photocurable ink adheres. As illustrated in FIGS. 1, 2, and 3, the active energy irradiation device 1 includes a housing 2, an irradiation unit 3, a heat sink (heat conduction member) 4, a first opening 5, an air introduction unit 6, a driver board 7, a second opening 8, and fans 9.

In the following description, for the sake of convenience in description, a direction in which the active energy irradiation device 1 emits ultraviolet rays is referred to as "downward", and an opposite side is referred to as "upward". A direction orthogonal to the "up-down direction" is referred to as a "left-right direction", and a direction orthogonal to the "up-down direction" and the "left-right direction" is referred to as a "front-rear direction".

The housing 2 has a rectangular box shape. The housing 2 is made of metal. The housing 2 accommodates the irradiation unit 3, the heat sink 4, the air introduction unit 6, and the driver board 7 therein. A light irradiation window 21 made of a glass plate is provided in a lower wall 2*a* of the housing 2.

The irradiation unit 3 is disposed in the housing 2. The irradiation unit 3 irradiates ultraviolet rays as active energy rays. The irradiation unit 3 includes a rectangular plate-shaped substrate 31 constituting a predetermined circuit, and ultraviolet light emitting diodes (LEDs) 32 which are light emitting elements arranged side by side at a predetermined pitch in the front-rear direction and the left-right direction on the substrate 31. The irradiation unit 3 is disposed at a lower end inside the housing 2 such that a thickness direction of the substrate 31 is the up-down direction. The object to be irradiated is irradiated with the ultraviolet rays emitted from the ultraviolet LED 32 of the irradiation unit 3 via the light irradiation window 21 of the housing 2.

The heat sink 4 is disposed in the housing 2. The heat sink 4 is thermally connected to the irradiation unit 3. The heat sink 4 is an air-cooling type heat dissipation member that dissipates heat by heat exchange with air. The air constitutes a heating medium (refrigerant or cooling air) for cooling the irradiation unit 3. The heat sink 4 includes a base plate 41 and a plurality of heat dissipation fins 42. The base plate 41 has a rectangular plate shape whose thickness direction is the up-down direction. Lower surfaces of the base plate 41 come into contact with the substrate 31 of the irradiation unit 3. The heat dissipation fin 42 has a flat plate shape whose thickness direction is the front-rear direction. The heat dissipation fins 42 are erected on an upper surface of the base plate 41. The heat dissipation fins 42 are arranged to be stacked with a gap in the front-rear direction. The heat sink 4 is fixed to the housing 2 by, for example, a screw or the like.

The first opening 5 is an opening provided in a side wall 2*b* of the housing 2. Here, the first opening 5 has a rectangular shape, and is formed in a central portion of the side wall 2*b* in the up-down direction. The first opening 5 constitutes an intake port for taking in air outside the housing 2 into the housing 2. The first opening 5 is opened in the left-right direction in the side wall 2*b* and communicates the inside and outside of the housing 2. The first opening 5 includes small openings 51 formed at one end and the other end of the side wall 2*b* in the front-rear direction, and a large opening 52 formed between the small openings 51.

The air introduction unit 6 is disposed in the housing 2. The air introduction unit 6 deflects air flowing into the housing 2 along the left-right direction (first direction) via the first opening 5 downward toward the heat sink 4 (second direction intersecting the first direction), and introduces the air into the heat sink 4. The air introduction unit 6 connects the first opening 5 and the heat sink 4. The air introduction unit 6 is disposed on the first opening 5 side in the housing 2.

The driver board 7 is disposed in the housing 2. The driver board 7 is a driving electric circuit substrate for driving the active energy irradiation device 1. The driver board 7 is disposed on a side opposite to the first opening 5 side in the housing 2 with the left-right direction as the thickness direction. The driver board 7 is fixed to the housing 2 with a screw or the like via, for example, a spacer (not illustrated) or the like. A lower portion of the driver board 7 is electrically connected to the substrate 31 of the irradiation unit 3. A power supply and signal input and output connector 71 is electrically connected to an upper portion of the driver board 7. The connector 71 is provided to protrude upward from a front end of an upper wall 2*c* of the housing 2.

The second opening 8 is an opening provided in the upper wall 2*c* of the housing 2. The second opening 8 constitutes an exhaust port for exhausting air in the housing 2 to the outside of the housing 2. The second opening 8 is opened in the upper wall 2*c* in the up-down direction and communicates the inside and the outside of the housing 2. The fans 9 are fixed on the second opening 8 in the upper wall 2*c* of the housing 2. The fans 9 pressure-feed air sucked from below (inside the housing 2) to above (outside the housing 2). Here, a pair of fans 9 is provided to be arranged in the front-rear direction. For example, an axial fan is used as the fan 9. Only one fan 9 may be provided, or three or more fans may be provided side by side.

In the present embodiment, the air introduction unit 6 includes a filter separator 61 and a filter 62.

The filter separator 61 defines (partitions) a space R positioned on the first opening 5 side and communicating with the outside via the first opening 5 in the housing 2. The filter separator 61 is fixed in the housing 2. The filter separator 61 includes a side plate (partition) 61*a* and an upper plate 61*b*. The side plate 61*a* has a rectangular flat plate shape whose thickness direction is the left-right direction. The side plate 61*a* is provided to face the first opening 5 in the housing 2. The side plate 61*a* is disposed away from the side wall 2*b* of the housing 2 by a predetermined distance. An upper end of the side plate 61*a* is positioned above the first opening 5. A lower end of the side plate 61*a* is positioned below the first opening 5 and is close to upper surfaces of the heat dissipation fins 42 of the heat sink 4. A front end of the side plate 61*a* comes into contact with a front wall 2*d* of the housing 2 without a gap. A rear end of the side plate 61*a* comes into contact with a rear wall 2*e* of the housing 2 without a gap. The side plate 61*a* is fixed to and supported by the driver board 7 via, for example, a stay 63. The upper plate 61*b* has a rectangular flat plate shape whose thickness direction is the up-down direction. One end side of the upper plate 61*b* in the left-right direction is provided to be continuous with the upper end of the side plate 61*a*. The other end side of the upper plate 61*b* in the left-right direction comes into contact with the side wall 2*b* of the housing 2 without a gap. The upper plate 61*b* is fixed to the side wall 2*b* of the housing 2 via a flange 64 with a screw or the like.

Figure 4:
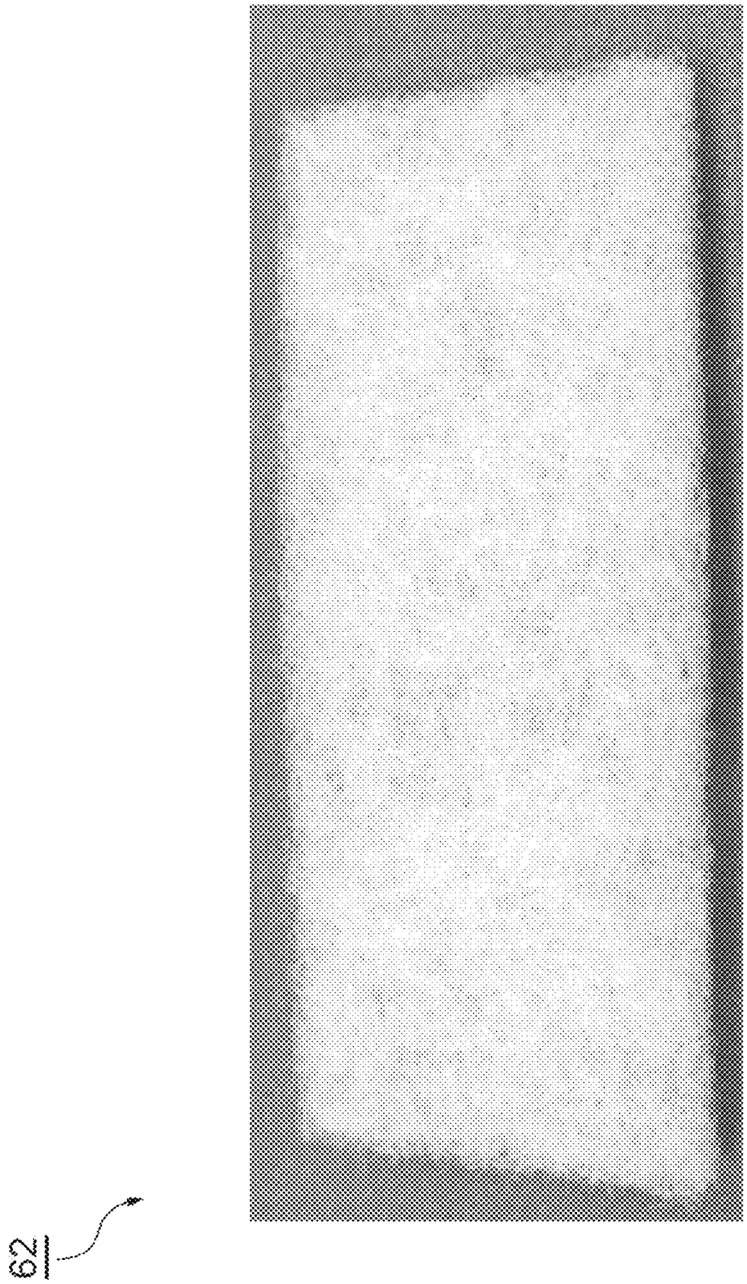
FIG. 4 is a photograph illustrating a filter according to the embodiment.

The filter 62 collects foreign substances contained in the air flowing into the housing 2. Examples of the foreign substances include ink mist, dirt, and dust. The filter 62 has, for example, a rectangular plate shape with a thickness of 10 mm (see FIG. 4). The filter 62 is made of, for example, urethane. The filter 62 is provided between the first opening 5 and the side plate 61*a* of the filter separator 61. The filter 62 is disposed in the space R. The filter 62 is exposed to the outside via the first opening 5.

The entire region of the filter 62 on the side plate 61*a* side (one end side in the left-right direction) comes into contact with the side plate 61*a* without a gap. The first opening 5 side (the other end side in the left-right direction) of the filter 62 comes into contact with the side wall 2*b* without a gap except for a region exposed from the first opening 5 (hereinafter, also referred to as a "filter exposure region Z0"). The entire upper region of the filter 62 comes into contact with the upper plate 61*b* of the filter separator 61 without a gap. The entire lower region of the filter 62 comes into contact with the upper surfaces of the heat dissipation fins 42 of the heat sink 4 without a gap. The filter 62 is supported or held by the filter separator 61, the heat sink 4, and the housing 2. The filter 62 is not bonded to the filter separator 61, the heat sink 4, and the housing 2 with an adhesive or the like. The filter 62 is pushed into the space R and comes into contact with the filter separator 61, the heat sink 4, and the housing 2. Such a filter 62 can be easily replaced by entering the space R via the first opening 5 and exiting the space R.

The filter 62 includes a first filter portion F1. The first filter portion F1 has a function or a role as a portion (that is, filter performance buffer region) that compensates for foreign substance collecting performance of the filter 62. The first filter portion F1 is provided on a lower side (in other words, a downstream side of the air) of the filter 62 on the heat sink 4 side. The first filter portion F1 is a portion that is not exposed from the first opening 5 and is covered with the side wall 2*b* of the housing 2 as viewed from the left-right direction. The first filter portion F1 is a portion having a volume of a predetermined amount or more. The first filter portion F1 is a portion coming into contact with the side plate 61*a* of the filter separator 61. The first filter portion F1 has a thickness enough to come into contact with the side plate 61*a*. The first filter portion F1 is provided to close a flow path of air in the air introduction unit 6, and comes into contact with an inner surface of the housing 2 and the side plate 61*a* without a gap.

Figure 5:
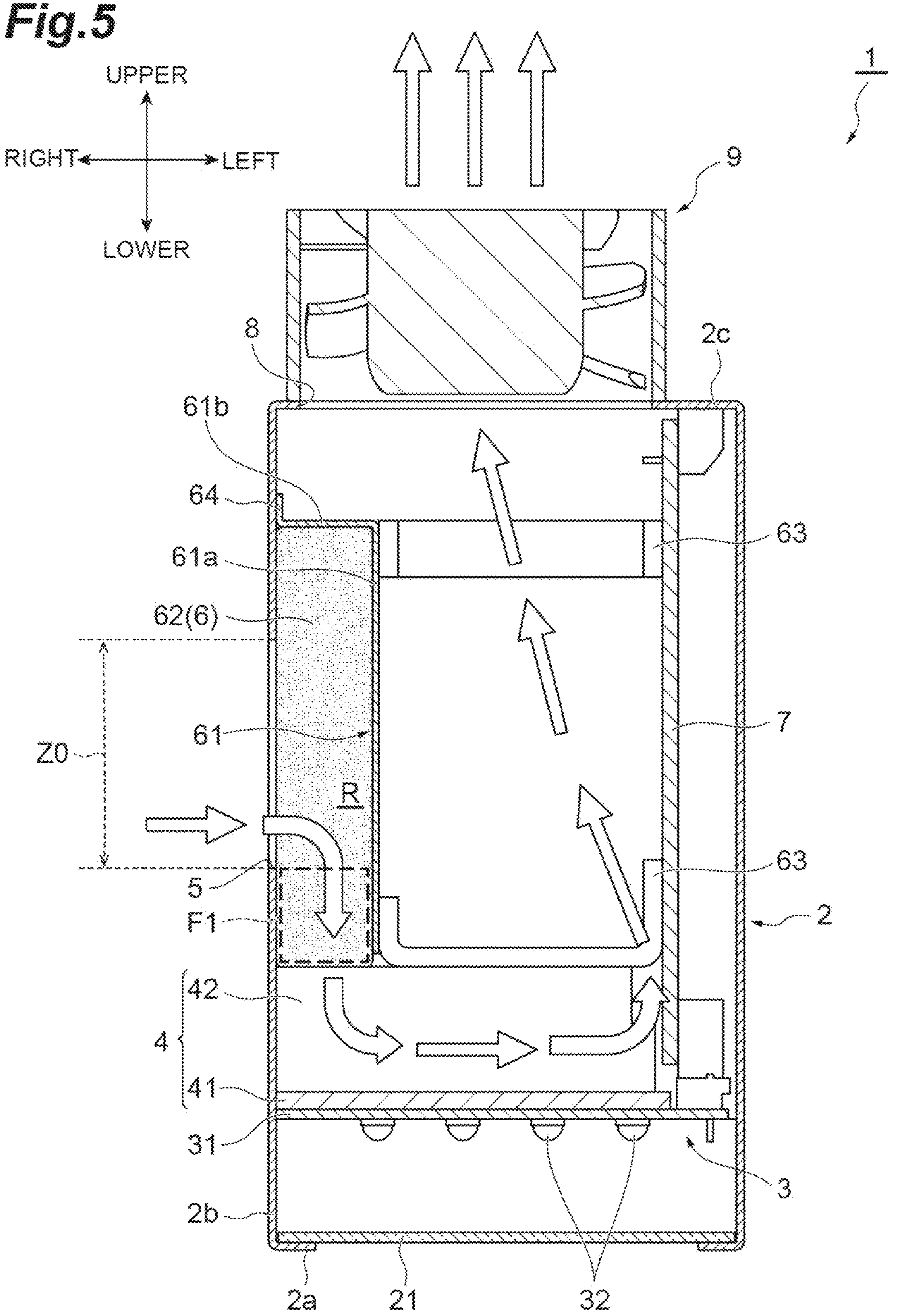
FIG. 5 is a cross-sectional view illustrating a flow of air in the housing at the beginning of use in the active energy irradiation device according to the embodiment.

In the active energy irradiation device 1 having the above configuration, as illustrated in FIG. 5, the air flowing into the housing 2 from the first opening 5 is introduced to the other end side in the left-right direction between the heat dissipation fins 42 of the heat sink 4 by the air introduction unit 6. In the air introduction unit 6, the foreign substances such as ink mist contained in the air are collected and removed by the filter 62. In particular, the first filter portion F1 of the filter 62 reliably collects the foreign substances of the air. Then, the air flows between the heat dissipation fins 42 toward one end side in the left-right direction, and thus, the heat sink 4 is cooled and the irradiation unit 3 is cooled. Thereafter, the air flows upward from between one end in the left-right direction between the heat dissipation fins 42 and the driver board 7, and is exhausted to the outside of the housing 2 from the second opening 8 by the fans 9.

Here, in the air introduction unit 6, the air flowing into the housing 2 along the left-right direction via the first opening 5 is deflected in a lower direction (a flow is bent by 90 degrees) and is introduced into the heat sink 4. As a result, in the filter exposure region Z0 of the filter 62, a portion through which air easily passes can be formed on a lower side where the air is deflected. Specifically, a portion through which air easily passes can be formed on a lower side of the filter exposure region Z0, and a portion through which air hardly passes can be formed on an upper side of the filter exposure region Z0. In other words, the filter 62 can be formed such that air easily passes as the air moves to the lower side of the filter exposure region Z0.

In addition, since formation of a space (gap) between the filter 62 and the filter separator 61 can be suppressed by the presence of the first filter portion F1, a difference in a resistance loss of the air in the filter 62 can be easily formed, and a portion through which air easily passes can be reliably formed in the filter exposure region Z0. When there is a space between the filter 62 and the filter separator 61, a difference in the resistance loss in the filter 62 is likely to be reduced, and it is difficult to form a portion through which air easily passes in the filter exposure region Z0.

Figure 6:
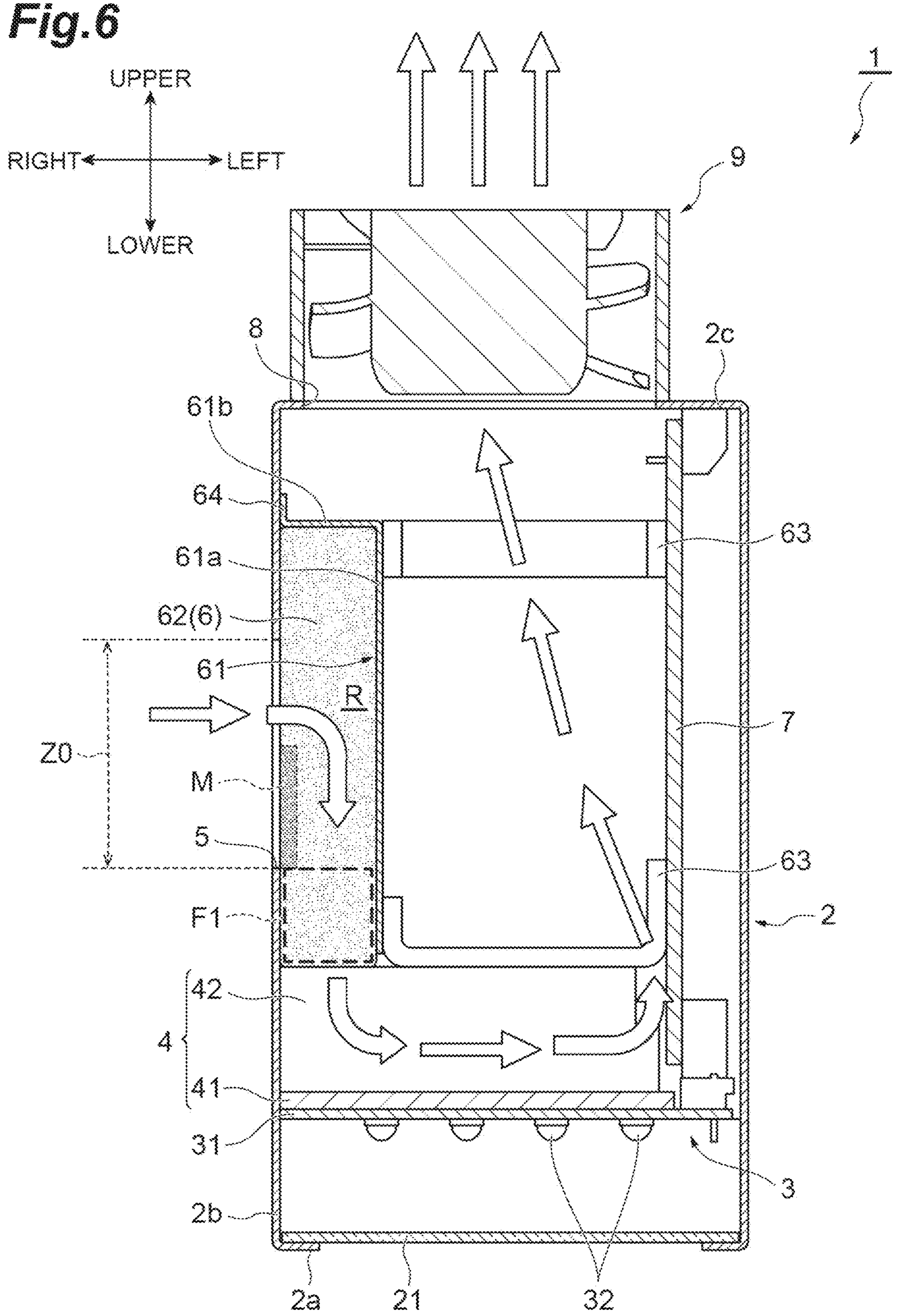
FIG. 6 is a cross-sectional view illustrating a flow of the air in the housing when a use time in the active energy irradiation device according to the embodiment increases.

Accordingly, at the beginning of use of the device, the air flowing into the housing 2 via the first opening 5 does not uniformly pass through the entire filter exposure region Z0, but mainly passes through a lower portion (part) of the filter exposure region Z0. Then, as illustrated in FIG. 6, when the use time of the device increases and clogging M progresses in the lower portion of the filter exposure region Z0, a region through which the air mainly passes transitions to the upper portion (other part) of the filter exposure region Z0. Such a transition is repeated as the use time of the device increases until the entire filter exposure region Z0 is clogged.

Consequently, according to the active energy irradiation device 1, even when the use time of the apparatus increases, as compared with a case where the entire filter 62 is uniformly clogged, it is easy to secure a region where the clogging M has not yet progressed in the filter exposure region Z0 of the filter 62, and it is easy to secure a distribution amount of the air introduction unit 6 similar to the distribution amount at the beginning of use. As a result, it is possible to suppress a decrease in a flow rate of air accompanying an increase in the use time, and it is possible to suppress an increase in a temperature of the irradiation unit 3 accompanying the increase in the use time. Even though the use time increases, for example, it is possible to suppress the decrease in the flow rate of air and the increase in the temperature of the irradiation unit 3 until the filter exposure region Z0 is completely clogged as a whole. The output of the active energy irradiation device 1 can be stabilized for a long time. It is possible to lengthen a time during which performance can be maintained before the replacement of the filter 62.

In the active energy irradiation device 1, the entire region of the filter 62 on the side plate 61*a* side of the filter separator 61 comes into contact with the side plate 61*a*. In this case, the filter 62 can be effectively supported by the side plate 61*a*.

The active energy irradiation device 1 includes the second opening 8 that is provided in the housing 2 and allows the air having passed through the heat sink 4 to flow out of the housing 2. In this case, the air having cooled the heat sink 4 can flow out of the housing 2 via the second opening 8.

The active energy irradiation device 1 includes the heat sink 4 as the heat conduction member. In this case, the irradiation unit 3 can be cooled by using the heat sink 4 as the heat conduction member.

In the active energy irradiation device 1, the irradiation unit 3 includes the plurality of ultraviolet LEDs 32. In this case, the irradiation unit 3 can irradiate the ultraviolet rays as the active energy.

In the active energy irradiation device 1, the filter 62 comes into contact with the heat dissipation fins 42 of the heat sink 4. In this case, the filter 62 can be effectively supported by the heat dissipation fins 42 of the heat sink 4.

In the active energy irradiation device 1, the first filter portion F1 of the filter 62 is provided to close the flow path of the air in the air introduction unit 6. In this case, the foreign substance collecting performance of the filter 62 can be reliably compensated by the first filter portion F1, and the foreign substances contained in the air can be more reliably collected.

In the active energy irradiation device 1, the first opening 5 has a rectangular shape with a large aperture ratio. In this case, the filter exposure region Z0 can be increased, and the convenience of replacement of the filter 62 can be enhanced. In addition, manufacturing cost can be suppressed.

Figure 7:
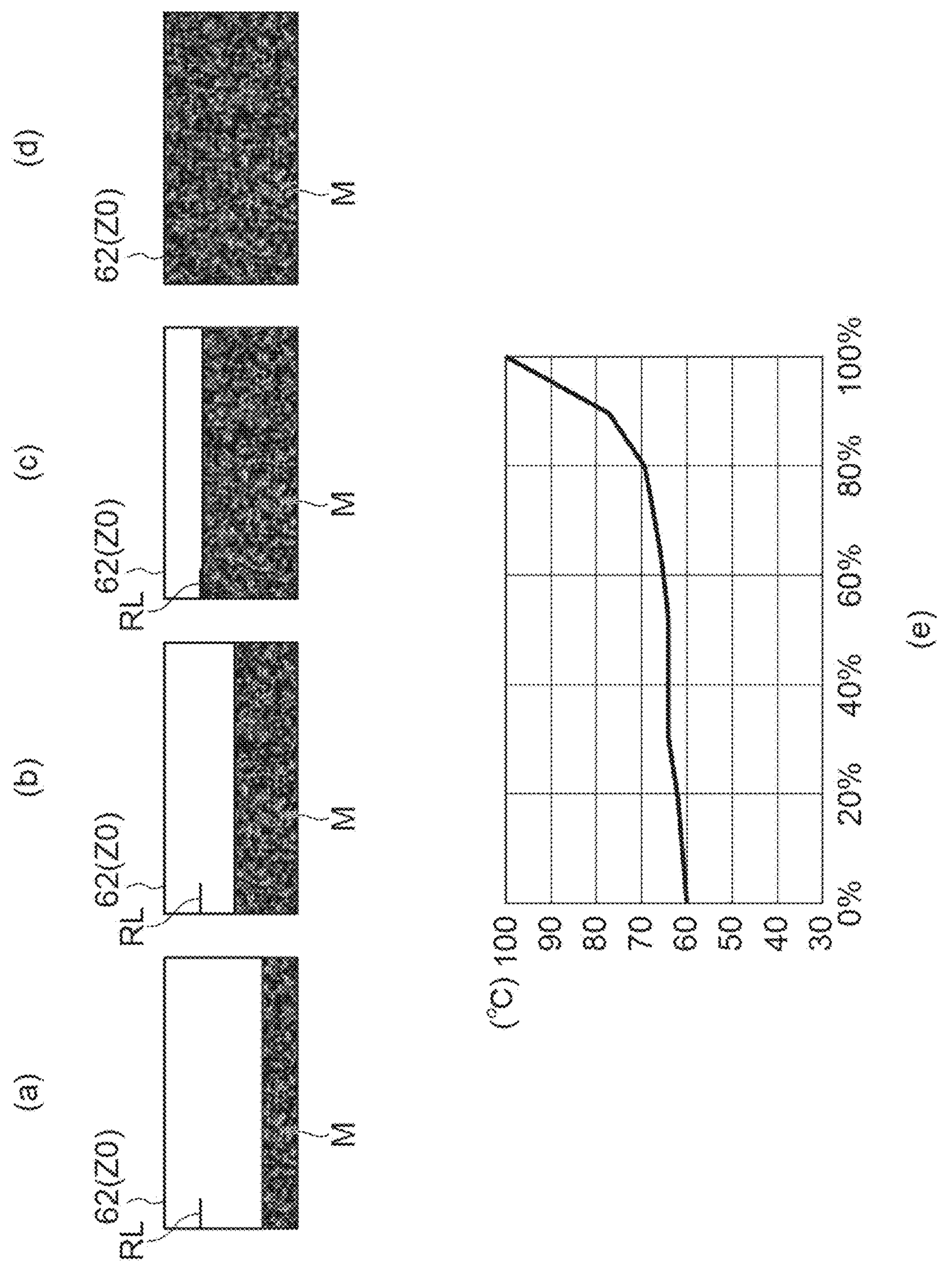
FIGS. 7(*a*) to 7(*d*) are diagrams illustrating a part of the filter in the active energy irradiation device according to the embodiment.

FIGS. 7(*a*) to 7(*d*) are diagrams illustrating a part of the filter 62 in the active energy irradiation device 1. FIG. 7(*e*) is a graph showing a relationship between the clogging of the filter 62 and the temperature of the irradiation unit 3 in the active energy irradiation device 1. In FIGS. 7(*a*) to 7(*d*), the use time of the device increases in this order. That is, in the present embodiment, as the use time increases, the filter exposure region Z0 of the filter 62 transitions to states illustrated in FIGS. 7(*a*) to 7(*d*) in this order. The up-down direction in each drawing corresponds to the up-down direction in FIG. 5. In FIG. 7(*e*), the vertical axis represents the temperature (° C.) of the irradiation unit 3, and the horizontal axis represents the ratio of clogging of the filter 62. A ratio of clogging corresponds to a degree of progress of clogging and corresponds to the use time of the device. The ratio of clogging indicates that clogging progresses as a value thereof increases, and does not depend on a location where clogging has occurred. A ratio of clogging of 50% means that the filter 62 is half clogged, and a ratio of clogging of 100% means that the filter 62 is completely clogged.

As illustrated in FIGS. 7(*a*) to 7(*d*), in the present embodiment, air mainly passes through the lower portion of the filter exposure region Z0 at the beginning of use, and the clogging M occurs therein. As the use time of the device increases, the region through which the air mainly passes transitions to the upper portion, and the clogging M also transitions to the upper portion. As a result, as illustrated in FIG. 7(*e*), for example, until the ratio of clogging of the filter 62 reaches 70% to 80% with the increase in the use time, it is possible to suppress the increase in the temperature of the irradiation unit 3, and it is possible to maintain the temperature of the irradiation unit 3 at 70° C. or lower.

A mark RL (see FIG. 7(*a*) and the like) indicating that the ratio of the clogging M of the filter 62 is a predetermined ratio may be provided to at least one of the filter 62 and the housing 2. In this case, it is possible to easily confirm whether or not the clogging M has transitioned to a predetermined ratio in the filter 62 by referring to the mark RL. In addition, for example, since the clogging M transitions to the upper portion, an instruction about a position corresponding to a filter replacement time (such as a position where the ratio of the clogging M becomes 70% to 80% (predetermined ratio)) is given with the mark RL. Accordingly, it is possible to indicate that it is the filter replacement time when the clogging M transitions to the instructed position, and it is possible to encourage the replacement of the filter 62. The mark RL is not particularly limited, and may be a line, a dot, or other marks. The position where the mark RL is provided is not particularly limited, and may be the filter 62, or alternatively or additionally, may be a periphery of the first opening 5 where the filter 62 is exposed in the side wall 2*b* of the housing 2. The predetermined ratio is not particularly limited, and may be various ratios.

In addition, the filter 62 may be a filter of a color (for example, a white or yellow ink is used for black ink, and a black ink is used for white ink) different from a printing color (color of the ink of the object to be irradiated as the printed matter). In this case, a state of transition of the clogging M to the upper portion becomes clear, and it is possible to easily confirm a degree of the clogging M.

Figure 8:
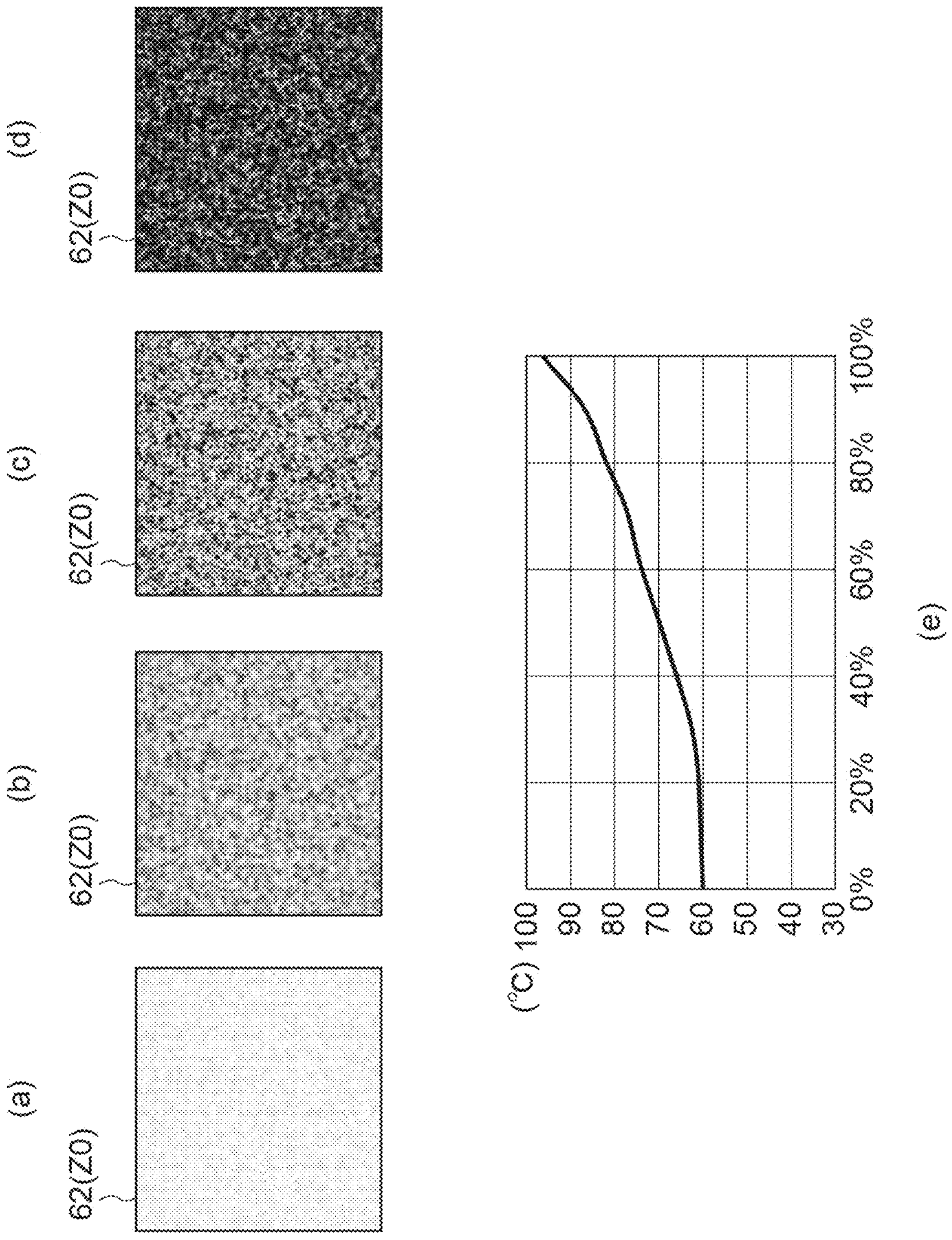
FIGS. 8(*a*) to 8(*d*) are diagrams illustrating a part of a filter in an active energy irradiation device according to a comparative example.

FIGS. 8(*a*) to 8(*d*) are diagrams illustrating a part of a filter 62 in an active energy irradiation device according to a comparative example. FIG. 8(*e*) is a graph showing a relationship between the clogging of the filter 62 and the temperature of the irradiation unit 3 in the active energy irradiation device according to the comparative example. The active energy irradiation device according to the comparative example is different from the active energy irradiation device 1 in that the entire filter 62 is uniformly clogged as the use time of the device increases. In FIGS. 8(*a*) to 8(*d*), the use time of the device increases in this order. That is, as the use time increases, the filter 62 transitions to states illustrated in FIGS. 8(*a*) to 8(*d*) in this order. The up-down direction in each drawing corresponds to the up-down direction in FIG. 5. In FIG. 8(*e*), a vertical axis represents the temperature (° C.) of the irradiation unit 3, and a horizontal axis represents the clogging ratio of the filter 62.

As illustrated in FIGS. 8(*a*) to 8(*d*), in the active energy irradiation device according to the comparative example, air is uniformly clogged in the entire filter 62 as the use time of the device increases from the beginning of use. As a result, as illustrated in FIG. 8(*e*), for example, it can be seen that the ratio of clogging of the filter 62 gradually increases with the increase in the use time, and the temperature of the irradiation unit 3 reaches 70° C. at a point in time when the ratio of clogging is 50%.

Figure 9:
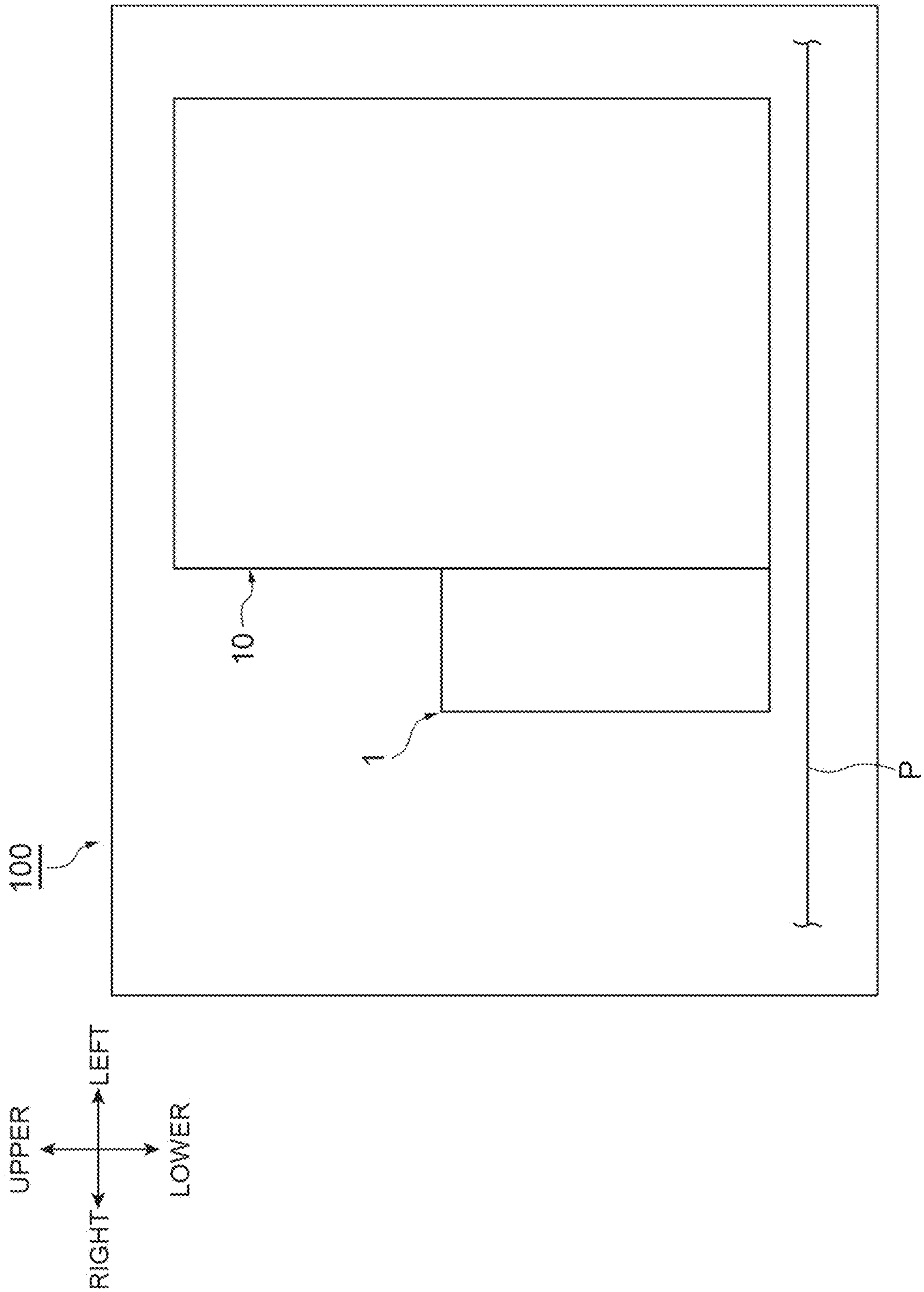
FIG. 9 is a schematic configuration diagram illustrating an inkjet printer including the active energy irradiation device according to the embodiment.

FIG. 9 is a schematic configuration diagram illustrating an inkjet printer 100 including the active energy irradiation device 1. As illustrated in FIG. 9, the active energy irradiation device 1 can be mounted on the inkjet printer 100. The inkjet printer 100 further includes a carriage 10. The carriage 10 includes a plurality of recording heads. The plurality of recording heads eject a photocurable ink toward a printed matter P conveyed in the left-right direction below the carriage 10. The carriage 10 and the active energy irradiation device 1 are connected in the left-right direction. In the inkjet printer 100, the carriage 10 and the active energy irradiation device 1 are scanned (moved) along the left-right direction at the time of printing. The inkjet printer 100 may include a plurality of active energy irradiation devices 1.

In such an inkjet printer 100, the above effect, that is, the effect of suppressing the increase in the temperature of the irradiation unit with the increase in the use time can be obtained by the active energy irradiation device 1.

An aspect of the present disclosure is not limited to the above embodiment.

Figure 10:
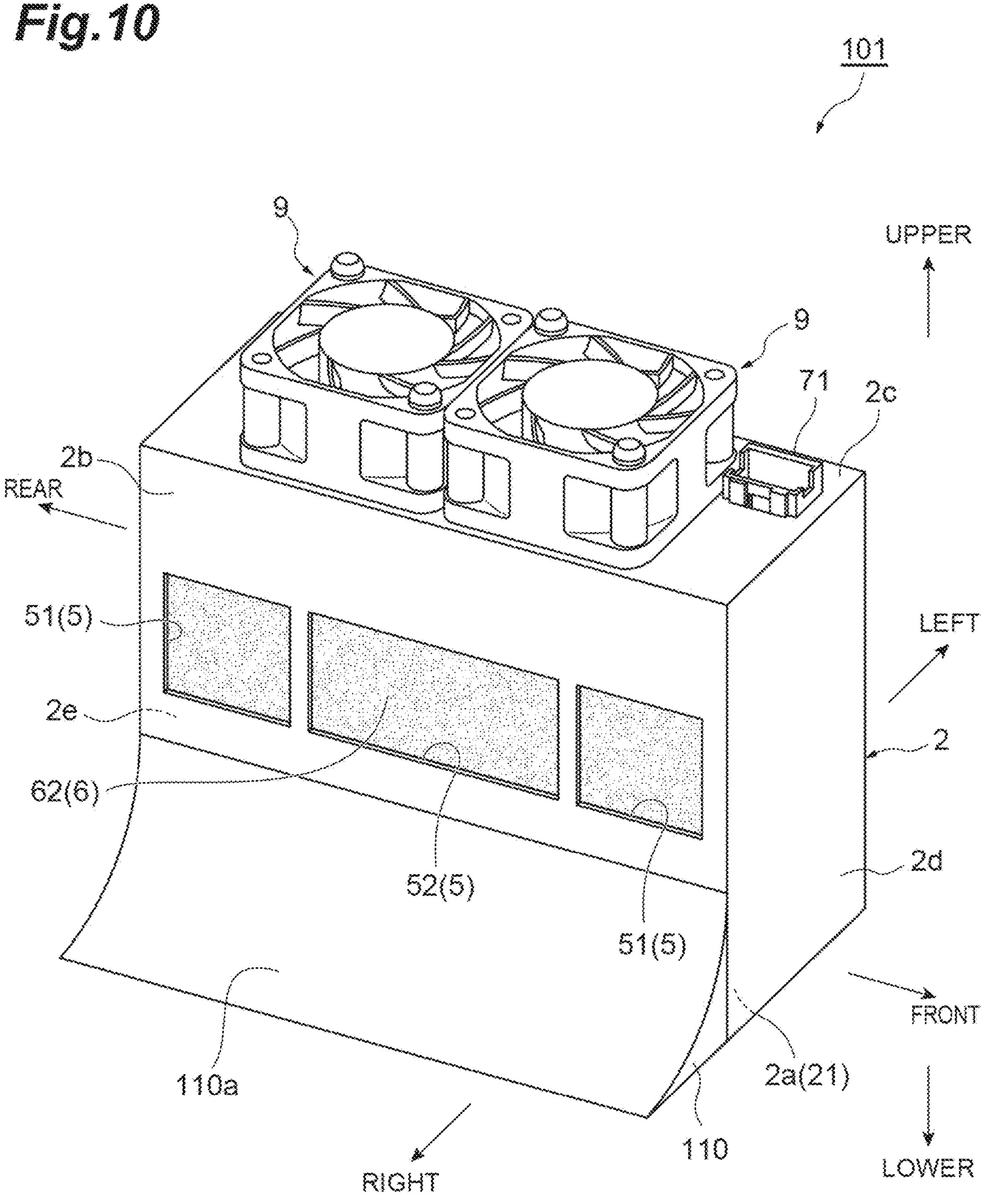
FIG. 10 is a perspective view illustrating an active energy irradiation device according to a first modification.
Figure 11:
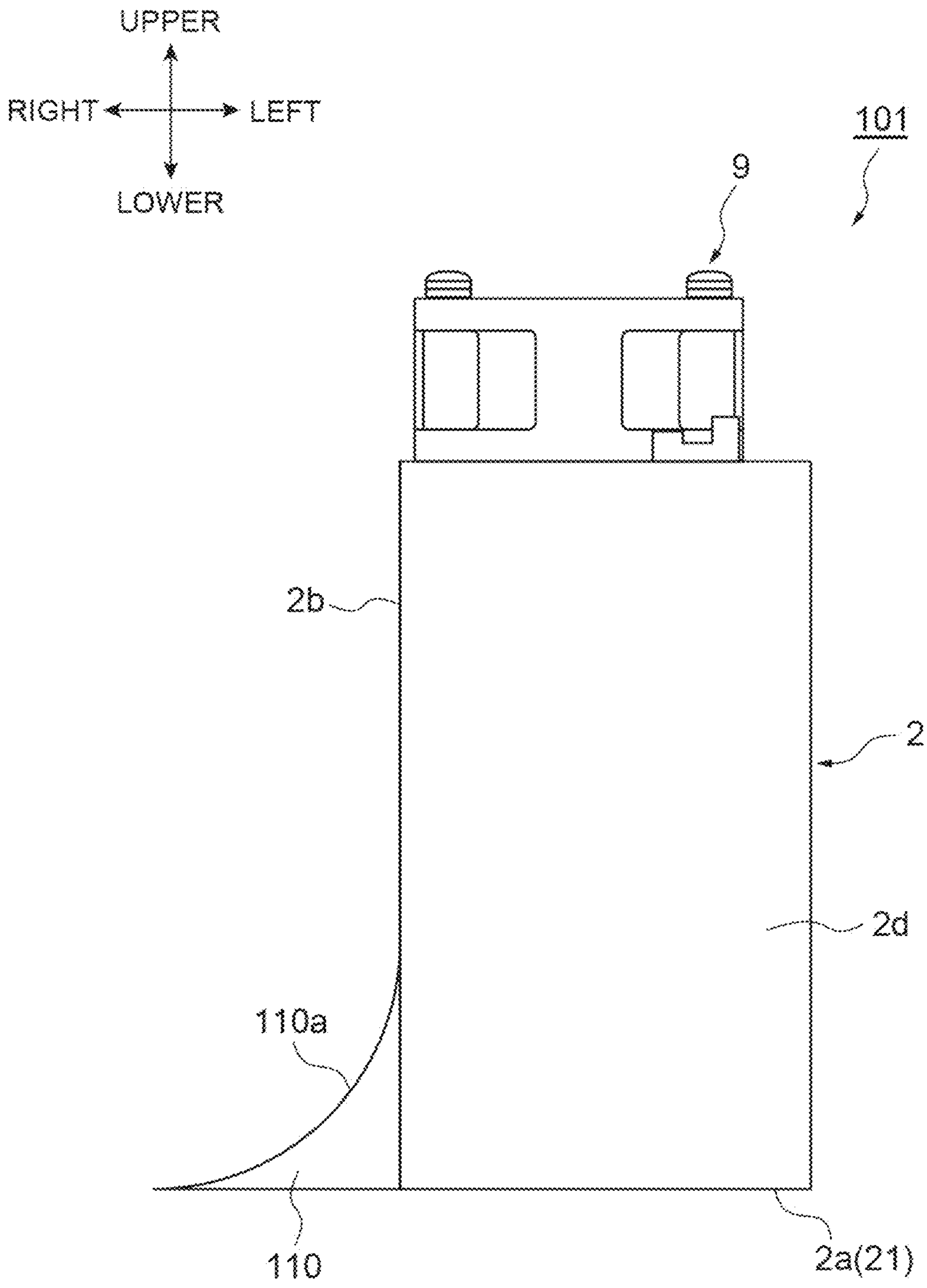
FIG. 11 is a front view illustrating the active energy irradiation device according to the first modification.

FIG. 10 is a perspective view illustrating an active energy irradiation device 101 according to a first modification. FIG. 11 is a front view illustrating the active energy irradiation device 101 according to the first modification. As illustrated in FIGS. 10 and 11, the active energy irradiation device 101 according to the first modification is different from the active energy irradiation device 1 (see FIG. 1) in that a skirt portion 110 is provided.

The skirt portion 110 is disposed below the first opening 5 (on the irradiation unit 3 side) on an outer surface of the side wall 2*b* of the housing 2. The skirt portion 110 is provided to protrude outward in the left-right direction from the outer surface of the side wall 2*b*. The skirt portion 110 is disposed on the outer surface of the side wall 2*b* in a range from a position away downward from the first opening 5 by a predetermined length to a lower edge, and is fixed to the side wall 2*b* with a screw or the like. The skirt portion 110 has a guide surface 110*a* as a curved surface smoothly continuing to the outer surface of the side wall 2*b*.

The guide surface 110*a* has an arc shape as viewed from the front-rear direction. An upper end of the guide surface 110*a* is continuous with the outer surface of the side wall 2*b*, and a lower end of the guide surface 110*a* is away outward in the left-right direction from the outer surface of the side wall 2*b*. A lower surface of the skirt portion 110 is flush with an outer surface of the lower wall 2*a* of the housing 2. A front surface of the skirt portion 110 is flush with an outer surface of the front wall 2*d* of the housing 2. A rear surface of the skirt portion 110 is flush with an outer surface of the rear wall 2*e* of the housing 2. Such a skirt portion 110 may be a machined part, a sheet metal part, or a resin molded part. Instead of or in addition to the curved surface, the guide surface 110*a* of the skirt portion 110 may include a flat surface that is linear as viewed from the front-rear direction. For example, the guide surface 110*a* may include an inclined surface that is away from the side wall 2*b* toward a lower side.

Figure 12:
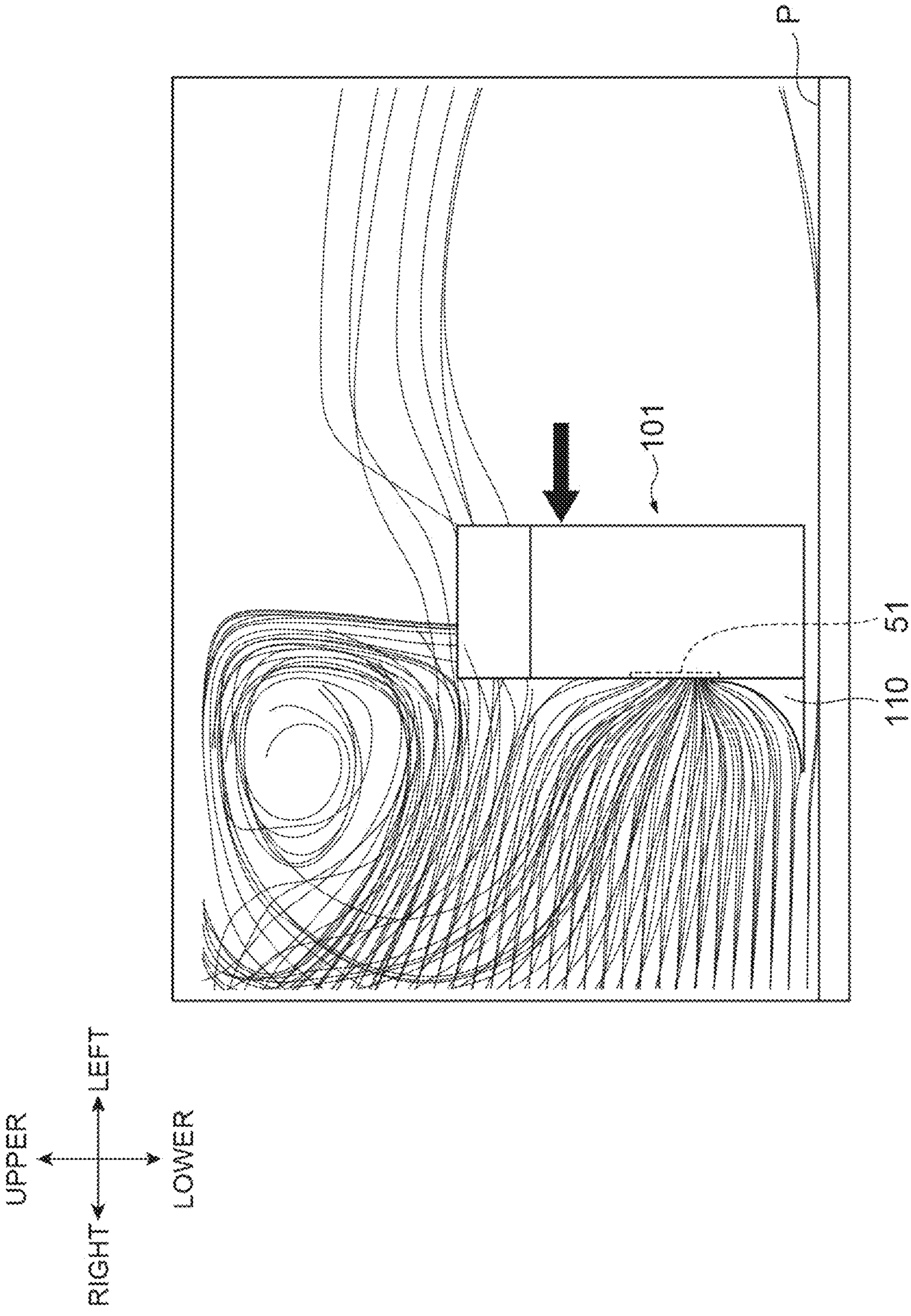
FIG. 12 is a simulation result showing a flow of air around the active energy irradiation device according to the first modification.
Figure 13:
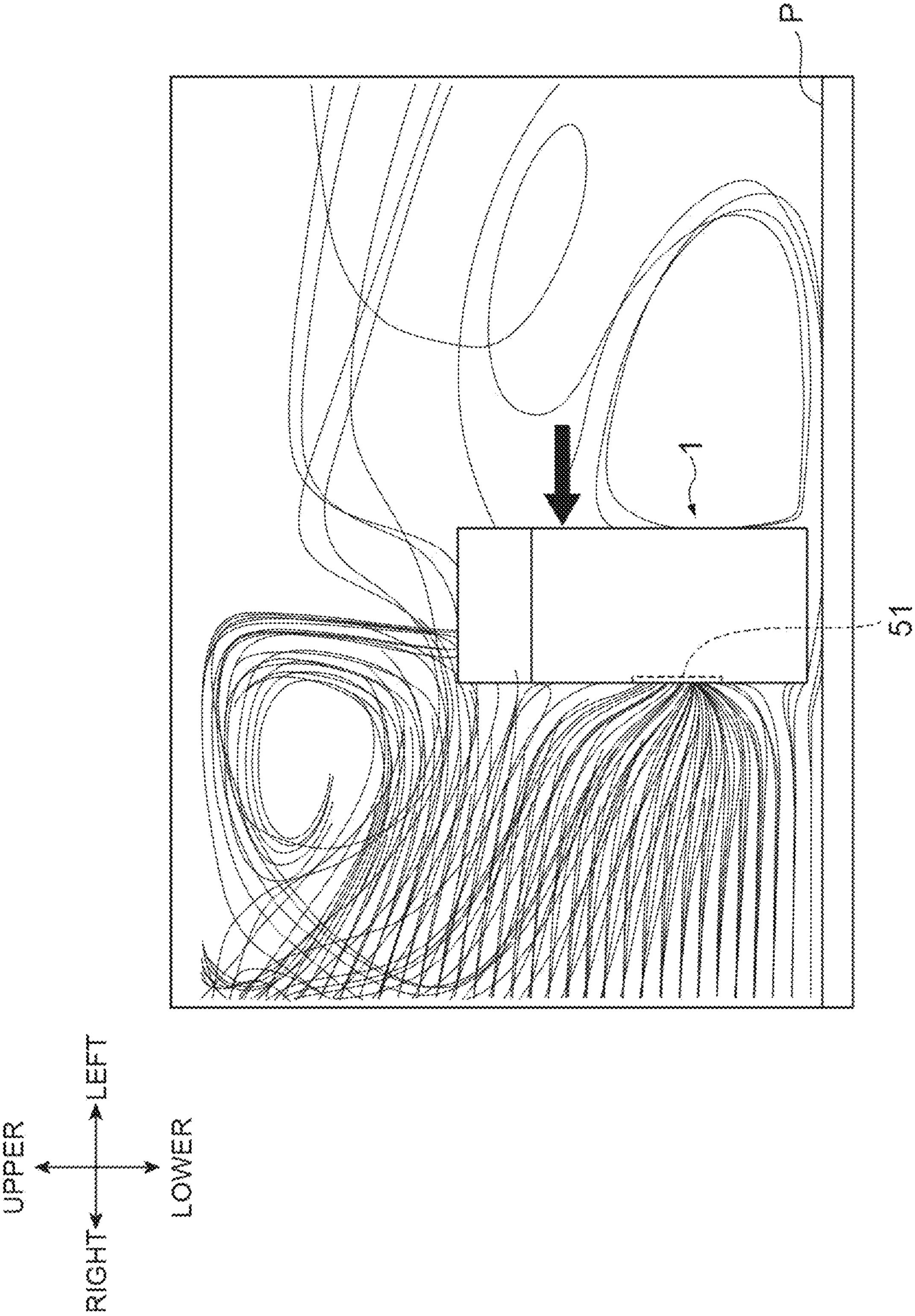
FIG. 13 is a simulation result showing a flow of air around the active energy irradiation device according to the embodiment.

FIG. 12 is a simulation result illustrating a flow of air around the active energy irradiation device 101. FIG. 13 is a simulation result illustrating a flow of air around the active energy irradiation device 1. In the illustrated examples, the printed matter P is conveyed in the left-right direction, and the active energy irradiation device 1 and 101 move in a left direction in the drawings above the printed matter P. Lines in the drawings represent the flow of the surrounding air.

As illustrated in FIGS. 12 and 13, in the active energy irradiation device 101, air containing foreign substances such as ink mist present around the device can be efficiently guided to the first opening 5 by the skirt portion 110. The ink mist can be guided to the first opening 5 by the skirt portion 110 to increase a collection rate of the ink mist. A possibility that the ink mist adheres to the printed matter P can be reduced, and the ink mist can be efficiently collected.

Figure 14:
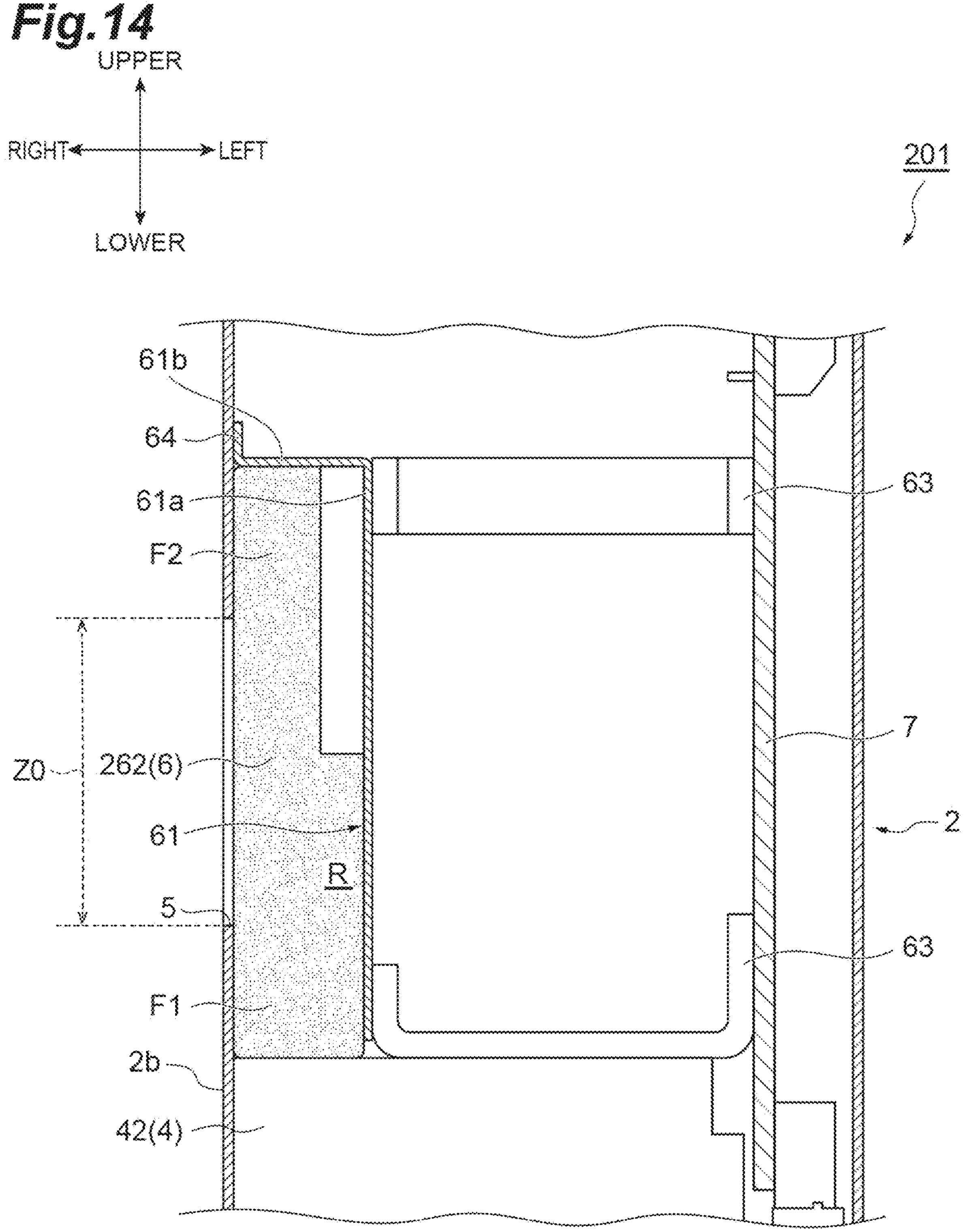
FIG. 14 is an enlarged cross-sectional view illustrating a part of an active energy irradiation device according to a second modification.

FIG. 14 is an enlarged cross-sectional view illustrating a part of an active energy irradiation device 201 according to a second modification. As illustrated in FIG. 14, the active energy irradiation device 201 according to the second modification is different from the active energy irradiation device 1 (see FIG. 3) in that the air introduction unit 6 includes a filter 262.

The filter 262 includes a second filter portion F2. The second filter portion F2 is provided on an upper side (at least a side opposite to the heat sink 4 side) of the filter 262. The second filter portion F2 is thinner than the first filter portion F1. The second filter portion F2 is provided at a portion of the filter 262 from an upper end to a position from a center to an upper center in the up-down direction of the filter exposure region Z0. The second filter portion F2 has a constant thickness thinner than the thickness of the first filter portion F1. A side plate 61*a* side of the second filter portion F2 is not in contact with the side plate 61*a*, and a gap is formed between the second filter portion F2 and the side plate 61*a*. That is, a step is formed on the side plate 61*a* side of the filter 262.

In a case where air is introduced into the heat sink 4 through a center or an upper side of the filter 62 (see FIG. 3), a passage path thereof becomes long and the resistance loss is likely to increase as compared with a case where air is introduced into the heat sink 4 through a lower side of the filter 62 (see FIG. 3). By doing this, when the clogging of the filter exposure region Z0 transitions upward from a lower portion as a use time of the device increases and the air mainly passes through the center or the upper side of the filter 62 (see FIG. 3), there is a possibility that the resistance loss is likely to increase.

In this regard, in the active energy irradiation device 201, the filter 262 includes the second filter portion F2. As a result, when the air mainly passes through the second filter portion F2 (when the clogging of the filter exposure region Z0 transitions upward due to an increase in the use time of the device), since the second filter portion F2 is thin, a passage path of the air in the filter 262 can be shortened, and thus, the resistance loss of the air can be reduced. It is possible to further suppress a decrease in a flow rate of air accompanying the increase in the use time, and it is possible to further suppress an increase in the temperature of the irradiation unit 3 accompanying the increase in the use time. It is possible to specifically realize the reduction of the resistance loss of the air in a case where the air passes through the upper side of the filter 262.

Figure 15:
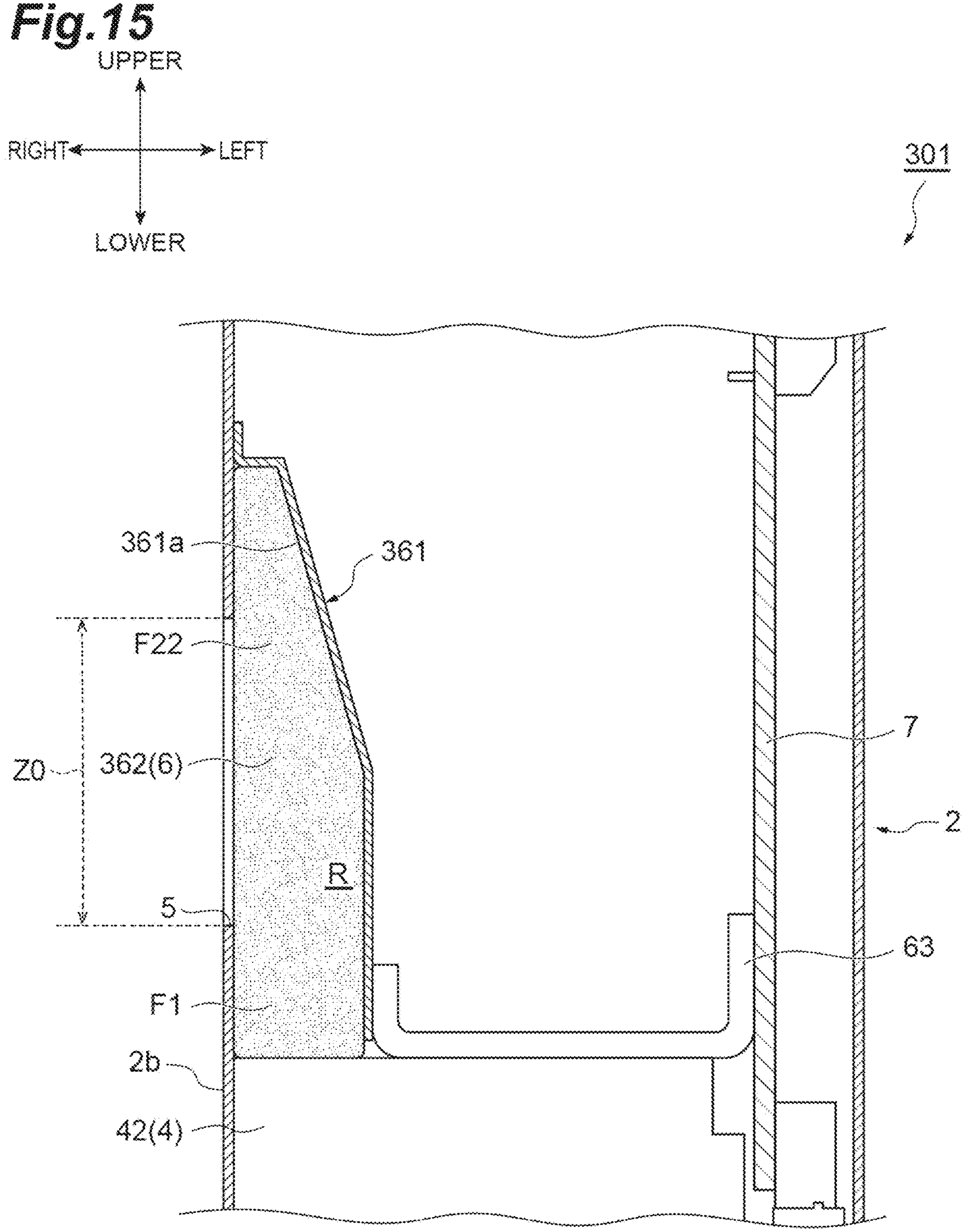
FIG. 15 is an enlarged cross-sectional view illustrating a part of an active energy irradiation device according to a third modification.

FIG. 15 is an enlarged cross-sectional view illustrating a part of an active energy irradiation device 301 according to a third modification. As illustrated in FIG. 15, the active energy irradiation device 301 according to the third modification is different from the active energy irradiation device 1 (see FIG. 3) in that the air introduction unit 6 includes a filter separator 361 and a filter 362.

The filter separator 361 has a side plate 361*a*. The side plate 361*a* is inclined such that an upper portion approaches the side wall 2*b* toward an upper side from a center or a position closer to an upper center in the up-down direction. The filter 362 includes a second filter portion F22. The second filter portion F22 is provided on an upper side of the filter 362. The second filter portion F22 is thinner than the first filter portion F1. A thickness of the second filter portion F22 thinner than the first filter portion F1 may be an average thickness or a minimum thickness of the second filter portion F22. The second filter portion F22 is provided at a portion of the filter 362 from an upper end to a position from a center to an upper center in the up-down direction of the filter exposure region Z0. The second filter portion F22 is configured such that a thickness in the left-right direction becomes thinner toward an upper side. Similarly to the side plate 361*a*, the side plate 361*a* side of the second filter portion F22 is inclined to approach the side wall 2*b* toward an upper side. The side plate 361*a* side of the second filter portion F22 comes into contact with the side plate 361*a* without a gap.

Similarly to the active energy irradiation device 201 according to the second modification, in the active energy irradiation device 301, when the air mainly passes through the second filter portion F22 (when the clogging of the filter exposure region Z0 transitions upward due to an increase in a use time of the device), since the second filter portion F22 is thin, the passage path of the air in the filter 362 can be shortened, and thus, the resistance loss of the air can be reduced. It is possible to further suppress a decrease in a flow rate of air accompanying the increase in the use time, and it is possible to further suppress an increase in the temperature of the irradiation unit 3 accompanying the increase in the use time. It is possible to specifically realize the reduction of the resistance loss of the air in a case where the air passes through the upper side of the filter 362.

Figure 16:
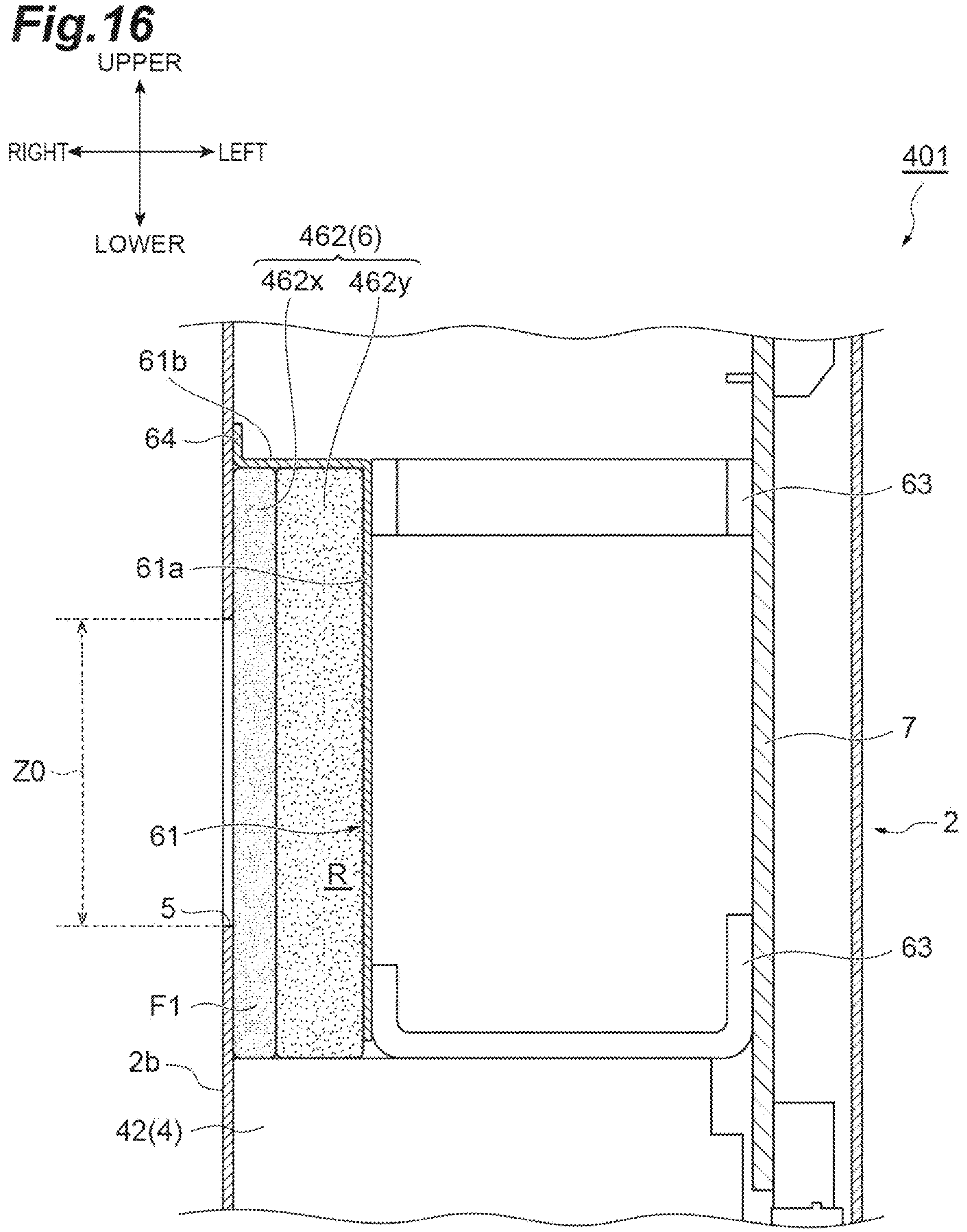
FIG. 16 is an enlarged cross-sectional view illustrating a part of an active energy irradiation device according to a fourth modification.

FIG. 16 is an enlarged cross-sectional view illustrating a part of an active energy irradiation device 401 according to a fourth modification. As illustrated in FIG. 16, the active energy irradiation device 401 according to the fourth modification is different from the active energy irradiation device 1 (see FIG. 3) in that the air introduction unit 6 includes a filter 462.

The filter 462 includes a plurality of layers. Here, the filter 462 includes a first filter layer 462*x* and a second filter layer 462*y*. The first filter layer 462*x* has a density higher (grain finer) than the second filter layer 462*y*. In other words, the second filter layer 462*y* has a density lower (grain coarser) than the first filter layer 462*x*. In the active energy irradiation device 401, in the air introduction unit 6, the foreign substances can be actively collected (caught) by the first filter layer 462*x* having a high density, and the resistance loss can be suppressed by the second filter layer 462*y* having a low density. As a result, a distribution amount of the air introduction unit 6 can be increased.

According to the active energy irradiation device 401, for example, the density of each of the first filter layer 462*x* and the second filter layer 462*y* in the filter 462 is changed, and thus, the foreign substance collection performance and the resistance loss of the air in the filter 462 can be adjusted. The filter 462 is not limited to a structure of two layers, and may have a structure of three or more layers. The density (roughness) of each of the plurality of layers of the filter 462 is not particularly limited, and may be appropriately set in accordance with, for example, required performance.

Figure 17:
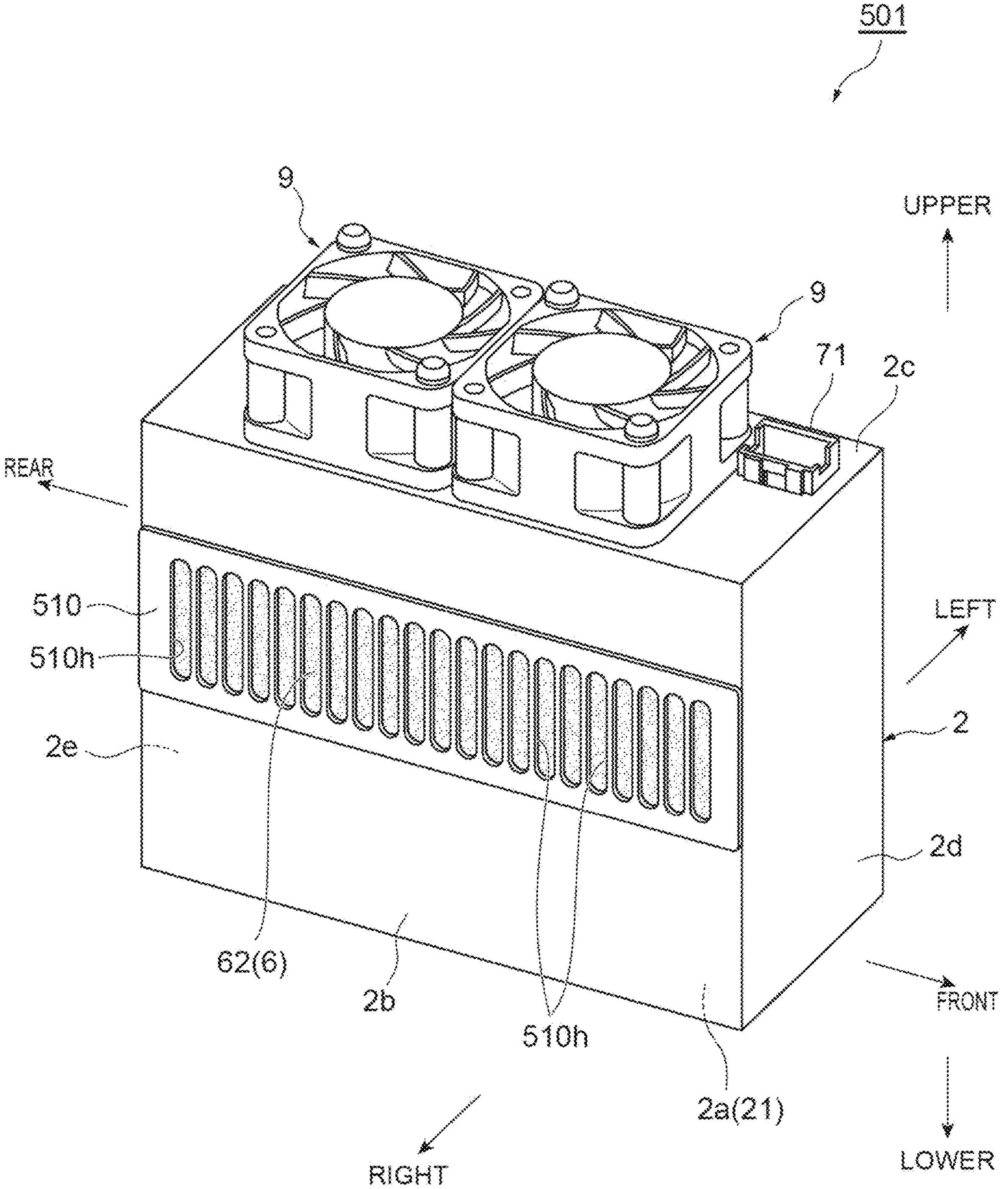
FIG. 17 is a perspective view illustrating an active energy irradiation device according to a fifth modification.

FIG. 17 is a perspective view illustrating an active energy irradiation device 501 according to a fifth modification. As illustrated in FIG. 16, the active energy irradiation device 501 according to the fifth modification is different from the active energy irradiation device 1 (see FIG. 3) in that a filter cover 510 is provided.

The filter cover 510 has a rectangular flat plate shape whose thickness direction is the left-right direction. The filter cover 510 comes into contact with the side wall 2*b* of the housing 2 without a gap to cover the first opening 5. The filter cover 510 is fixed to the side wall 2*b* with, for example, a screw. In the filter cover 510, a plurality of long holes 510*h* that are long in the up-down direction and penetrate in the left-right direction are formed to be arranged at a predetermined interval in the front-rear direction. A width of each of the long holes 510*h* in the front-rear direction is smaller than a width of the small opening 51 of the first opening 5 in the front-rear direction. The filter cover 510 exposes the filter exposure region Z0 from the plurality of long holes 510*h* while covering the filter exposure region Z0 of the filter 62. Instead of or in addition to the long holes 510*h*, a plurality of round holes, hexagonal holes, square holes, and meshes may be formed in the filter cover 510.

According to the active energy irradiation device 501, the filter 62 can be protected by the filter cover 510. In addition, the filter cover 510 can prevent the filter 62 from easily escaping from the housing 2 via the first opening 5.

Figure 18:
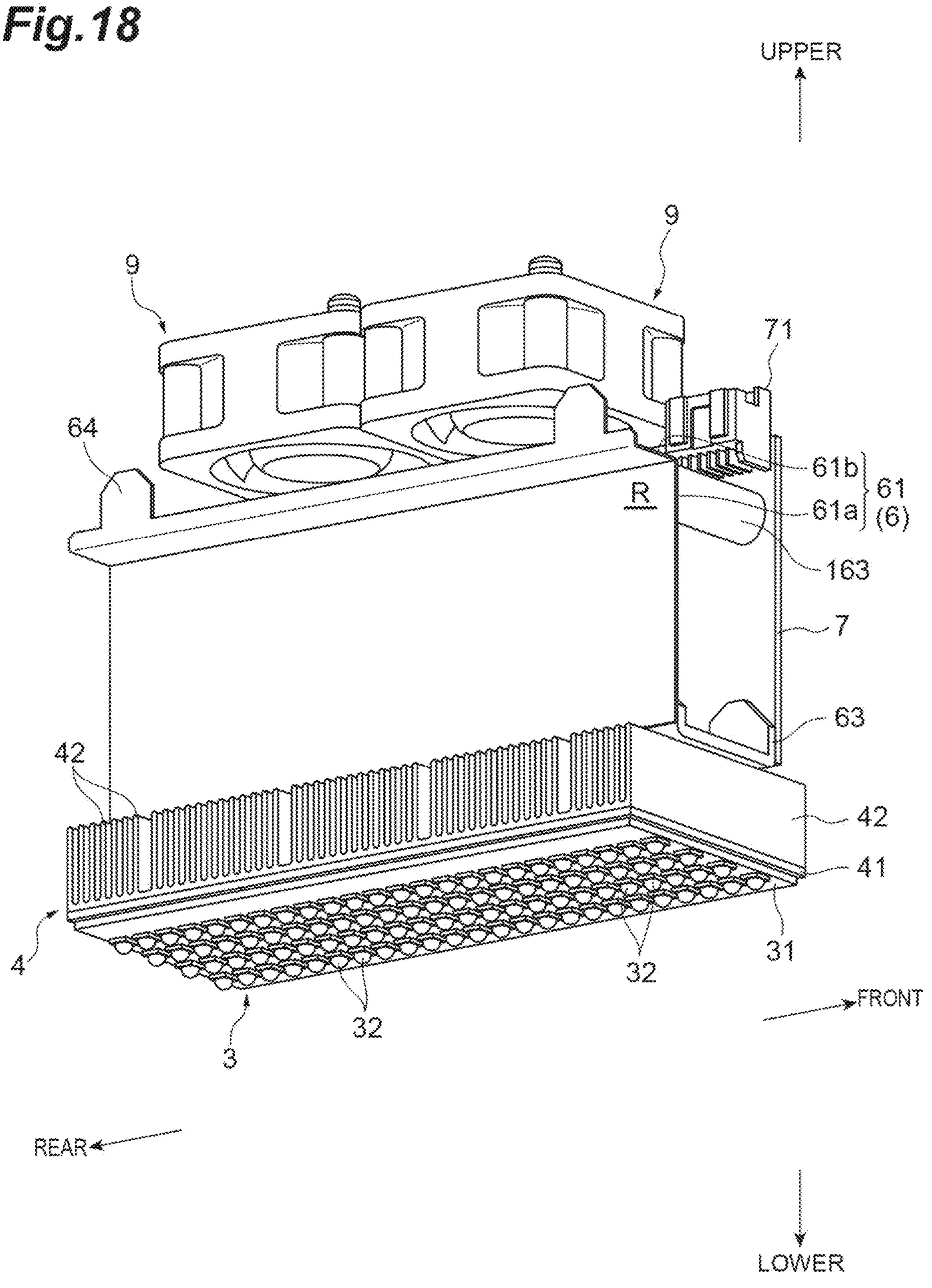
FIG. 18 is a perspective view illustrating an active energy irradiation device according to a sixth modification.

In the above embodiment, although the side plate (partition) 61*a* of the filter separator 61 is fixed and supported via the stay 63 (see FIG. 2), an aspect of fixing and supporting the filter separator 61 is not particularly limited. For example, as illustrated in FIG. 18, the side plate 61*a* of the filter separator 61 may be fixed to and supported by the driver board 7 via a columnar spacer 163.

In the above-described embodiment and modifications, although the irradiation unit 3 irradiates the irradiation of the ultraviolet rays as the active energy rays, the active energy ray is not particularly limited, and may be an electron beam. In this case, the active energy irradiation device can be used as a device that irradiates the electron beam.

Various materials and shapes can be applied to each configuration in the above-described embodiment and modifications without being limited to the above-described materials and shapes. In addition, each configuration in the above-described embodiment and modifications can be arbitrarily applied to each configuration in other embodiments or modifications.

REFERENCE SIGNS LIST

1, 101, 201, 301, 401, 501 active energy irradiation device
2 housing
3 irradiation unit
4 heat sink (heat conduction member)
5 first opening
6 air introduction unit
8 second opening
32 ultraviolet LED
61*a*, 361*a* side plate (partition)
62, 262, 362, 462 filter
100 inkjet printer
110 skirt portion
F1 first filter portion
F2, F22 second filter portion

The invention claimed is:

1. An active energy irradiation device comprising:
- a housing;
- an irradiation unit that is disposed in the housing, and is configured to irradiate active energy rays;
- a heat conduction member that is disposed in the housing, and is thermally connected to the irradiation unit;
- a first opening that is provided at the housing; and
- an air introduction unit that deflects air flowing into the housing along a first direction via the first opening to a second direction intersecting the first direction to introduce the air to the heat conduction member, wherein
- the air introduction unit includes
- a partition that is provided to face the first opening in the housing, and
- a filter that is provided between the first opening and the partition, and collects foreign substances contained in the air, and
- the filter includes
- a first filter portion that is provided on the heat conduction member side to come into contact with the partition without being exposed from the first opening as viewed from the first direction.

2. The active energy irradiation device according to claim 1, wherein an entire region of the filter on the partition side comes into contact with the partition.

3. The active energy irradiation device according to claim 1, wherein the filter includes a second filter portion that is provided on at least a side opposite to the heat conduction member side, and has a thickness in the first direction thinner than the first filter portion.

4. The active energy irradiation device according to claim 3, wherein the second filter portion is configured such that the thickness in the first direction becomes thinner toward the side opposite to the heat conduction member side.

5. The active energy irradiation device according to claim 3, wherein the second filter portion has a constant thickness thinner than the first filter portion.

6. The active energy irradiation device according to claim 1, further comprising: a skirt portion that is disposed on the irradiation unit side from the first opening on an outer surface of the housing, and is provided to protrude in the first direction.

7. The active energy irradiation device according to claim 1, wherein the filter includes a plurality of layers.

8. The active energy irradiation device according to claim 1, further comprising: a second opening that is provided in the housing, and causes the air having passed through the heat conduction member to flow out of the housing.

9. The active energy irradiation device according to claim 1, wherein the heat conduction member is a heat sink.

10. The active energy irradiation device according to claim 1, wherein the irradiation unit has a plurality of ultraviolet LEDs.

11. The active energy irradiation device according to claim 1, wherein the filter comes into contact with the heat conduction member.

12. The active energy irradiation device according to claim 1, wherein the first filter portion is provided to cover a flow path of the air in the air introduction unit.

13. The active energy irradiation device according to claim 1, wherein a mark indicating that a clogging ratio of the filter is a predetermined ratio is provided to at least any one of the filter and the housing.

14. The active energy irradiation device according to claim 1, wherein the active energy irradiation device irradiates a printed matter to which ink adheres, as an object to be irradiated, and the filter is a filter of a color different from a color of the ink.

15. An inkjet printer comprising the active energy irradiation device according to claim 1.

* * * * *